US009727034B1

United States Patent
Ross et al.

(10) Patent No.: US 9,727,034 B1
(45) Date of Patent: Aug. 8, 2017

(54) UNSCENTED CONTROL FOR UNCERTAIN DYNAMICAL SYSTEMS

(71) Applicant: The United States of America, as represented by the Secretary of the Navy, Washington, DC (US)

(72) Inventors: Isaac Michael Ross, Monterey, CA (US); Ronald J. Proulx, Waban, MA (US); Mark Karpenko, Marina, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 358 days.

(21) Appl. No.: 14/699,051

(22) Filed: Apr. 29, 2015

Related U.S. Application Data

(60) Provisional application No. 61/985,917, filed on Apr. 29, 2014.

(51) Int. Cl.
*G05B 13/02* (2006.01)
(52) U.S. Cl.
CPC .................. *G05B 13/024* (2013.01)
(58) Field of Classification Search
CPC .............. G05B 13/024; G05B 15/02
See application file for complete search history.

(56) References Cited

PUBLICATIONS

I. Michael Ross, Christopher N. D'Souza, "Hybrid Optimal Control Framework for Mission Planning", Journal of Guidance, Control, and Dynamics vol. 28, No. 4, Jul.-Aug. 2005.*

Simon J. Julier, "The Spherical Simplex Unscented Transformation", Proceedings of the American Control Conference Denver, Colorado Jun. 4-6, 2003.*
Vander Stoep, D. R., "Trajectory Shaping for the Minimization of State-Variable Estimation Errors," IEEE Transactions on Automatic Control, AC-13:284-286, 1968.
Zimmer, S., Ocampo, S., and Bishop, R., "Reducing Orbit Covariance for Continuous Thrust Spacecraft Transfers," IEEE Transactions on Aerospace and Electronic Systems, 46:771-791, 2010.
Julier, S. J. and Uhlmann, J. K., "A New Extension of the Kalman Filter to Nonlinear Systems," Proceedings of AeroSense: The 11th International Symposium on Aerospace/Defense Sensing, Simulation and Controls, Orlando, FL, SPIE 1997.
Julier, S. J., Uhlmann, J. K. and Durrant-Whyte, H. F. "A New Approach for Filtering Nonlinear Systems," Proceedings of the American Control Conference, Seattle, WA, 1995, pp. 1628-1632.

(Continued)

*Primary Examiner* — Kenneth M Lo
*Assistant Examiner* — David Wynne
(74) *Attorney, Agent, or Firm* — Naval Postgraduate School; Lisa A. Norris; James B. Potts

(57) ABSTRACT

Unscented optimal control combines the unscented transform with optimal control to produce a new approach to directly manage navigational and other uncertainties in an open-loop framework. The sigma points of the unscented transform are treated as controllable particles that are all driven by the same open-loop controller. A system-of-systems dynamical model is constructed where each system is a copy of the other. Pseudo-spectral optimal control techniques may be applied to this system-of-systems to produce a computationally viable approach for solving the large-scale optimal control problem.

19 Claims, 8 Drawing Sheets

(56) References Cited

PUBLICATIONS

Julier, S. J., "The Spherical Simplex Unscented Transformation," Proceedings of the American Control Conference, Denver, CO, Jun. 4-6, 2003, vol. 3, pp. 2430-2434.

Julier, S.J. and Uhlmann, J.K., "A consistent, debiased method for converting between polar and Cartesian coordinate systems," Proceedings of SPIE—The International Society for Optical Engineering, pp. 110-121 (1997).

* cited by examiner

UNSCENTED CONTROL FOR UNCERTAIN DYNAMICAL SYSTEMS

This application claims the benefit of U.S. Provisional Application No. 61/985,917, filed Apr. 29, 2014, which is hereby incorporated in its entirety by reference.

BACKGROUND OF THE INVENTION

1. Field of the Invention

The present invention is directed to the field of dynamic system control. In particular, the present invention is directed to the field of improved open loop control of uncertain dynamical systems.

2. Description of the Related Technology

In control of dynamical systems, feedback is generally utilized to achieve a specified performance despite a range of system (plant) uncertainty. Such uncertainty may be the result of physical changes in the characteristics of the system under control that occur over time, for example due to age or use, or that occur due to changes in the environment, such as the change in density of the atmosphere as a function of altitude, season, latitude, longitude, and local time of day. In addition, system uncertainty may arise in the control system design due to the operator's lack of knowledge or ignorance of the true values of the system parameters. For example in the control of the angular rotation of a rigid body, an important system parameter is the inertia of the body about the rotational axis. In general, an estimate of the inertia is developed based on measurements of certain characteristics of the body such as its mass distribution and dimensions. However, since these parameters are often difficult to measure with precision, the exact value of the inertia is difficult to predict. As a consequence, it is difficult in practice to achieve a desired input-output relation due to imprecise knowledge of the system. The role of feedback is therefore to obtain the desired input-output relation within desired tolerances despite the system uncertainty, which may additionally include the effects of disturbances acting on or within the system.

In a feedback dynamic control system, sensors are used to measure the system variables or states. The sensor data is processed and fed back into the input of the system to force the system to produce an acceptable output despite uncertainty. In this setting, the system accuracy can be no greater than the accuracy of the sensors used to provide the feedback. As a consequence, the performance of the feedback system will become degraded when sensors fail. In the situation where the sensors fail completely, that is to say the sensors can no longer produce an output that allows the system states to be estimated, the feedback mechanism will also fail and it will become impossible to control the system. In this situation, it may still be possible to achieve a specified performance tolerance if a suitable open-loop control (one that does not rely on sensor data for implementation) can be designed and applied to the system.

In the past, feedback has been utilized to achieve the necessary sensitivity reduction by using sensors to measure the system state so that the system state may be compared with the desired state. As a consequence of this comparison, an error signal may be computed and subsequently filtered by a feedback law in order to generate a control input to drive the plant. By measuring the system states, any deviations caused by parametric uncertainties or other disturbances are automatically accommodated by the resulting changes in the error signal. In the event that some or all of the system sensors fail, it becomes impossible to correctly compute the error signal and as a consequence an incorrect control signal will be output by the feedback law. In general, this will cause the response of the dynamical system under control to drift outside of the desired tolerance. In some cases, the control system can become unstable causing the destruction of the system.

An approach for operating a dynamical system in the absence of, or degradation of feedback sensors, is to implement an open-loop control system by designing a suitable control history a priori and using it to drive the system directly. Designing an open-loop control history to correctly manage uncertainty and thereby achieve the desired tolerances for the system response is a considerable challenge and consequently very little has been done to address this issue.

One representative approach employs the concept of a system sensitivity function, obtained by linearizing the system dynamics that attempts to capture the effects of uncertainty in the neighborhood of the system response obtained under nominal conditions. Open-loop control is implemented by introducing a constraint that requires the sensitivity states to be forced to zero at or near the final time. One difficulty with this approach is that the construction of the sensitivity function is generally based on the linearization of a dynamical model of the system. As a result, uncertainties causing significant drifts may be difficult or impossible to accommodate. This can lead to failure of the open-loop control to achieve the desired objective(s).

SUMMARY OF THE INVENTION

An aspect of the present invention is a method for providing unscented system control. The method comprises identifying a dynamical model of the system and determining a vector of one or more uncertain parameters and/or initial conditions of the system. Sigma points and weights for each of the uncertain parameters and/or initial conditions are then computed using the unscented transform to encode the statistical information of the uncertain parameter/initial condition distributions into a small number of points. Using sigma points computed for capturing the effects of uncertain system parameters and/or initial conditions, along with a dynamical system model, two or more copies of equations for dynamics of the system are created (one for each of the two or more sigma-point vectors). Copies of the equation of the dynamics of the system corresponding to each sigma point are used to propagate the uncertain dynamics so that the influence of the uncertain parameters and/or initial conditions can be determined and thereby modified or controlled according to the objectives or desired outcome of the user of the unscented system control process. Controlling or otherwise modifying the effects of the uncertain parameters and/or initial conditions on the system response, as modeled using the sigma points along with copies of a dynamical system model, is accomplished by constructing and solving an optimal control problem using the two or more copies of the dynamical system model with appropriate constraints as determined by the user of the process. As part of the present invention, an optimal control problem is thus constructed that minimizes the cost functional and achieves an outcome. Optionally, at least one box bound and/or one or more linear or non-linear path constraints and/or one or more linear or non-linear terminal constraints (on the boundary conditions) are then established for the system. Unscented optimal control computations are then performed using said two or more copies of the equations for the dynamics of the system while minimizing the cost function and adhering to the defined problem constraints. Control instruction is then provided to the system based on results obtained from the unscented optimal control computation.

In one embodiment, pseudo-spectral optimal control theory is employed in the step of performing the unscented optimal control computations.

One or more of the at least one outcome and/or box bound and/or path constraint and/or terminal constraint and/or cost function may be weighted functions of the sigma points and may satisfy the weighted function:

$$g_L(X(t)) \leq \Sigma_{i=1}^{N\sigma} w_i r(X_i(t)) \leq g^U(X(t))$$

where
$r: \mathbb{R}^n \to \mathbb{R}^k$, $g_L: \mathbb{R}^n \to \mathbb{R}^k$, $g^U: \mathbb{R}^n \to \mathbb{R}^k$
with
$g^L \leq g^U$, component-wise
where $X_i(t)$ is the vector of values of one replica of the state space corresponding to the i-th sigma point. In one embodiment, weighted functions of the sigma points can provide the mean values or combinations of the mean values of the system states X(t), wherein the bounds, gL and gU are each vectors whose individual entries may be functions of X(t), or constants, or zero, w is a vector of weights associated with sigma points and Nσ is the number of sigma points.

In another embodiment, one or more of the at least one outcome and/or box bound and/or terminal constraint and/or path constraint and/or cost function satisfy the weighted function:

$$h_L(X(t)) \leq \Sigma_{i=1}^{N\sigma} w_i(X_i(t) - \mu_i)(X_i(t) - \mu_i)^T \leq h^U(X(t))$$

representing constraints on the covariance of the system states X(t), or combinations thereof, bounds hL and hU are matrices whose individual entries may be functions of X(t), or constants, or zero, w is a vector of weights associated with sigma points and Nσ is the number of sigma points. For each of the above mentioned embodiments, the variable t can be a continuous variable or represent a discrete set of values, $t_j$, j=1, . . . , k, including the final value, $t_f$. In one embodiment of the present invention, the weighted functions described above or their variants may be applied as terminal conditions in which case variable t is taken as an initial time $t_o$ or as a final time $t_f$.

The unscented optimal control computation may minimize the cost function $J = E(X(t_0, t_f)) + \int_{to}^{tf} F(X(t), u(t), t) dt$, wherein E is an endpoint cost function whose value depends on the values of state variables in vector X at an initial time $t_0$ and/or a final time $t_f$, F is a running cost functional whose value at time t depends on the integral of the function F from an initial time $t_o$ to a final time $t_f$, and the value of function F at a particular time depends on the values of the state variables in vector X and/or the values of the control variables in vector u and/or time t.

In one embodiment, the function $E = \Sigma_{i=1}^{N\sigma} w_i X_i(t_f)$ and, in an alternative embodiment, the function $E = \Sigma_{i=1}^{N\sigma} w_i (X_i(t_f) - \mu_i(t_f))(X_i(t_f) - \mu_i(t_f))^T$. Also, in certain embodiments, the function $F = \Sigma_{i=1}^{N\sigma} w_i (X_i(t_f) - \mu_i(t_f))(X_i(t_f) - \mu_i(t_f))^T$.

In some embodiments, the uncertain parameters and/or initial states of the system have uniform probability distributions. In other embodiments, the uncertain parameters and/or initial states of the system have Gaussian probability distributions. In still other embodiments, the uncertain parameters and/or initial states of the system have mixed Gaussian and uniform probability distributions. These embodiments are expected in common practice, however, other embodiments are possible wherein the uncertain parameters and/or initial states of the system may have mixed probability distributions other than Gaussian or uniform.

The system may be configured for control of a device or a component of a device selected from satellites, aircraft, rockets, robots, automobiles, heavy machinery engines, chassis systems, hydraulic systems, pneumatic systems, unmanned systems, autonomous systems, chemical processes, energy conservation systems, quantum systems, financial and epidemic/biological systems. In certain embodiments, the system is configured as a guidance and/or navigation system.

The invention also relates to a control system comprising a controller configured to implement the method of the invention, preferably for control of a device or a component of a device selected from satellites, aircraft, rockets, robots, automobiles, heavy machinery engines, chassis systems, hydraulic systems, pneumatic systems, unmanned systems, autonomous systems, chemical processes, energy conservation systems, quantum systems, financial and epidemic/biological systems. The control system may also be configured for guidance and/or navigation and, in some embodiments the control system is an open loop control system.

DETAILED DESCRIPTION OF THE PREFERRED EMBODIMENT(S)

Figure 1:
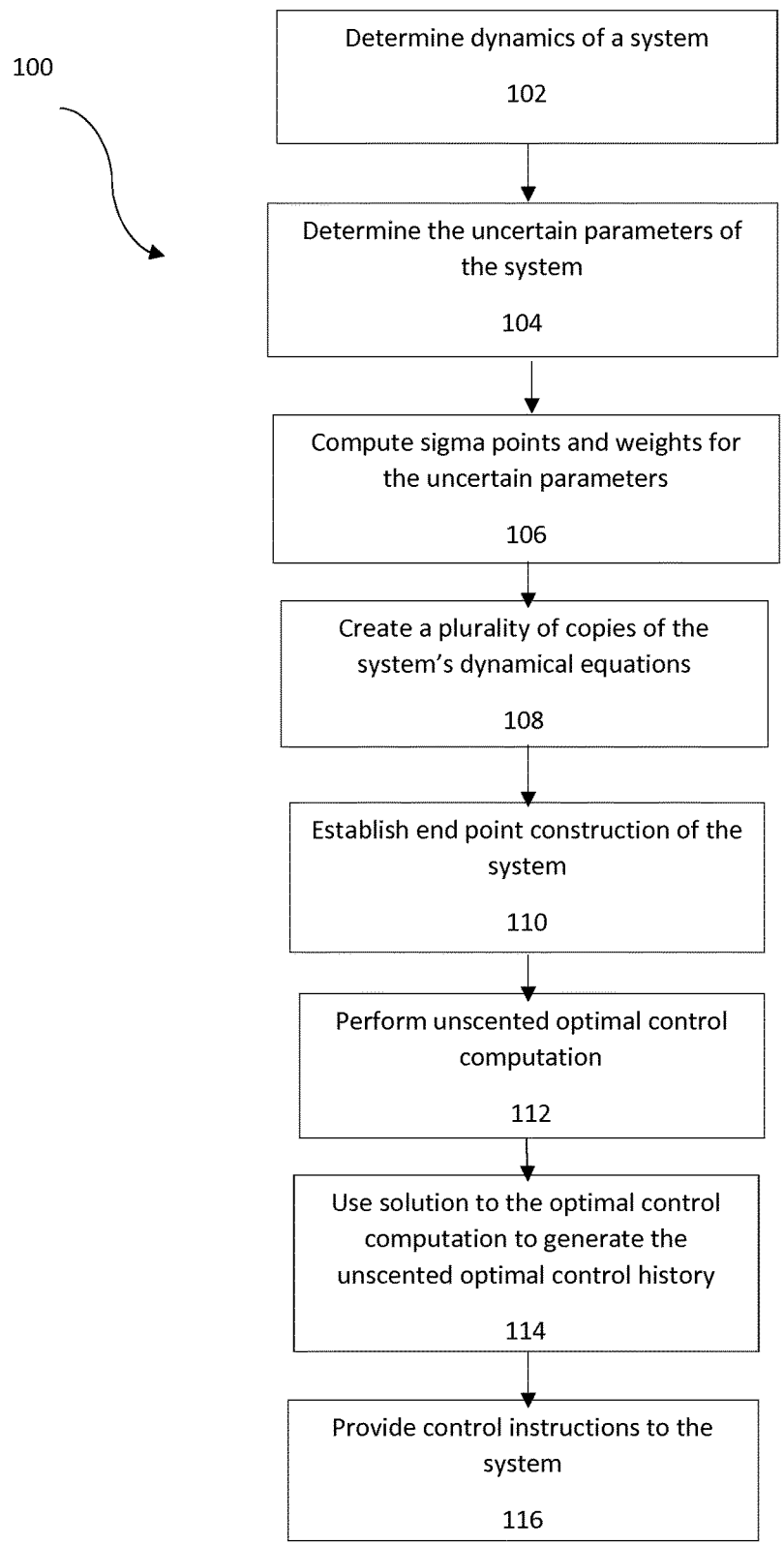
FIG. 1 is a flow chart of the method for providing unscented optimal control to a system.

For illustrative purposes, the principles of the present disclosure are described by referencing various exemplary embodiments. Although certain embodiments are specifically described herein, one of ordinary skill in the art will readily recognize that the same principles are equally applicable to, and can be employed in other systems and methods.

Before explaining the disclosed embodiments of the present disclosure in detail, it is to be understood that the disclosure is not limited in its application to the details of any particular embodiment shown. Additionally, the terminology used herein is for the purpose of description and not of limitation. Furthermore, although certain methods are described with reference to steps that are presented herein in a certain order, in many instances, these steps may be performed in any order as may be appreciated by one skilled in the art; the novel methods are therefore not limited to the particular arrangement of steps disclosed herein.

It is to be noted that as used herein and in the appended claims, the singular forms "a", "an", and "the" include plural references unless the context clearly dictates otherwise. Furthermore, the terms "a" (or "an"), "one or more" and "at least one" can be used interchangeably herein. The terms "comprising", "including", "having" and "constructed from" can also be used interchangeably.

The present invention provides a method and system for determining and implementing open-loop control for a dynamical system. This system may be described mathematically by a state space model to achieve a specified performance tolerance on the output state or other system states despite uncertainties that may also include the effects of disturbances acting on the system.

In the present invention, the effects of uncertainties are characterized through the use of the unscented transform as a collection of sigma points. The open-loop control is determined as a solution to an unscented optimal control problem by propagating or collocating the sigma points using an equal number of copies of a model. The desired performance tolerances are realized by enforcing constraints on the propagated or collocated sigma points either during the evolution of the state trajectories and/or at a terminal event and/or by minimizing a cost functional whose value may depend fully or in part upon the propagated or collocated sigma points. Each copy of a model is driven by the same open-loop control trajectory. Therefore, the specified tolerances for the system performance will be realized by open-loop control of the uncertain dynamical system over the entire range of uncertainty described or otherwise encoded by the sigma points. In this way, it is possible to control an acceptable output in the presence of uncertainty and without reliance on feedback from sensors. Such a sensor-less control scheme can be utilized to recover systems with failed sensors and/or may be utilized to reduce or eliminate the need for sensors in the control of dynamical systems.

"System sensitivity" is defined as a measure of the change in the response of a dynamical system to a given control input arising from uncertainties in the system parameters, from disturbances and/or arising from uncertainty in the initial conditions. In order to design a control input to a dynamical system to achieve a result within prescribed tolerances on the system response it is necessary to develop a control input profile that drives the system in such a way that the resulting output reduces the system sensitivity as much as possible. That is to say the output is made insensitive to the perturbations caused by uncertainty.

The method and apparatus of the present invention provide a new approach for open-loop control of linear or nonlinear systems that combines unscented transforms with optimal control theory so as to directly manage uncertainties in an open loop framework. In the present invention, the sigma points associated with the unscented transform in addition to the other system states as described by a mathematical model of a dynamical system, are treated as controllable particles that are all driven by the same open-loop control. The behavior of the controllable particles, as a function of time, can be modified by changing the open-loop control. Hence optimal control can be used to find an open-loop control trajectory that meets the constraints on the system performance as defined by a user of the process.

A system-of-systems dynamical model, which may be a linear model or a nonlinear model, is constructed where each system is a copy of the other. In application of the controllable particle assumption, each particle is driven by the same open-loop control. Thus, because the sigma points capture and encode statistical information about the system uncertainty it is possible to ensure that the response of the uncertain process adheres to tolerances prescribed by the user by appropriately constraining the behavior of the system-of-systems over time. Pseudo-spectral optimal control techniques may be applied to this system-of-systems for constraining the system and for obtaining a solution of the resulting large-scale optimal control problem and to obtain a control history to assist in achieving the user specified objectives. The method and apparatus of this invention enables the design and implementation of an open-loop control system that produces an acceptable output in the presence of uncertainty and with at least a reduced reliance on feedback from sensors.

In one embodiment of the present invention, the open-loop control system of the present invention may be used to operate a feedback system with one or more failed sensors. In this embodiment, the control system of the invention can supplement or replace the feedback control system as desired. For example, the control system of the invention may be used for emergency or temporary control in the advent of the failure of one or more sensors in a feedback control system until the feedback control system is repaired or replaced. Alternatively, the control system of the present invention can be used for permanent partial or complete control of any system that initially relied on feedback control in order to supplement or completely replace the feedback control system.

In certain embodiments of the present invention, the solution of the optimal control problem may be implemented in a feedback control system in order to reduce the control effort, e.g. number of sensors, amount of sensor data, etc. that is required to manage the system.

The present invention provides a method and system of using unscented optimal control. This can be applied to design the control commands for a broad range of control problems. For example, the concepts of the invention can be used to solve an attitude control problem in an uncertain environment. In principle, unscented optimal control concepts can be applied to any controllable process with uncertain parameters and/or initial conditional and/or disturbances.

The unscented transform is a mathematical function used to estimate the result of applying a given nonlinear transformation to a probability distribution that is characterized only in terms of a finite set of statistics. The unscented transform has been used as a means to design nonlinear filters without linearization. The unscented transform is also used in situations where it is better to approximate a probability distribution function than to linearize a generic nonlinear function due to the magnitude of error introduced by linearization. Unscented optimal control combines the unscented transform with optimal control to produce an approach to directly manage uncertainties in an open-loop framework. The implementation of the method of the present invention is set forth in greater detail below.

In the first step of the method a dynamical model of the system is identified. For example, $x^0 \in \mathbb{R}^{N_x}$ defines the initial random state of a nonlinear controlled dynamical system with a mean $\mu_x$, and a covariance $\Sigma_x$. Then, a set of sigma-points, $P = [\vec{P}_1, \ldots, \vec{P}_n]$ is identified that characterizes uncertain parameters of the dynamical system. For each sigma-point, $\vec{P}_i$, a copy of the underlying state dynamics is generated, $\chi_i(t)$, with implicit dependence of the i-th sigma point, and with initial conditions $\chi_1^0, \chi_2^0, \ldots, \chi_{N_\sigma}^0$, at $t=t^0$. For this initial description of the method, a joint Gaussian probability distribution function for the set of sigma-points P is used. However, as discussed below, the unscented transform holds for non-Gaussian probability distribution functions as well and thus other probability distributions such as a uniform distribution or a combination of a Gaussian and a uniform probability distribution as may be employed within the scope of the invention.

Parameters that may be used to identify the dynamic system depend on the particular system. For mechanical systems, uncertain parameters can be mass, inertia actuator alignment vectors, friction, component dimensions, as well as other parameters. For electrical systems, uncertain parameters can be resistance, inductance, capacitance, as well as other parameters. For aerospace systems, uncertain parameters can be aerodynamic coefficients, mass and inertial properties, control surface effectiveness, feedback margins, center of gravity, thermal conductivity, radiation, as well as others. In some systems, environmental parameters can be variations in temperature, pressure, humidity, wind speed, electromagnetic field strength, solar radiation pressure, aerodynamic drag, obstacles, the presence or influence of other controlled systems, keep out or no-fly zones, weather cells, and other effects.

The dynamics of the nonlinear dynamical system are given by, $$\dot{x} = f(x, u, t) \quad (1)$$

where $u \in \mathbb{U} \subseteq \mathbb{R}^{N_u}$ is the control variable and is differentiable with respect to $x \in \mathbb{X} \subseteq \mathbb{R}^{N_x}$. Then, the dynamics of each sigma point dependent copy of the dynamical system, $\chi_i$, $i=1, \ldots, N_\sigma$ are given by $\dot{\chi}_i = f(\chi_i, u, t)$. Let X be an $N_\sigma N_x$-dimensional vector given by, $$X := \begin{bmatrix} \chi_1 \\ \chi_2 \\ \vdots \\ \chi_{N_\sigma} \end{bmatrix} \in \mathbb{R}^{N_\sigma N_x}$$

Then, the dynamics of X produced by $N_\sigma$ copies of F are given by, $$\dot{X} = \begin{bmatrix} f(\chi_1, u, t) \\ f(\chi_2, u, t) \\ \vdots \\ f(\chi_{N_\sigma}, u, t) \end{bmatrix} := F(X, u, t)$$

In unscented optimal control, the controlled dynamical system $\dot{X} = F(X, u, t)$, is considered. The initial state is given by, $$X(t_0) = X^0 := \begin{bmatrix} \chi_1^0 \\ \chi_2^0 \\ \vdots \\ \chi_{N_\sigma}^0 \end{bmatrix}.$$

The objective is to find a control trajectory, $t \mapsto u$, that drives $X^0$ to a target state, which may or may not be a fixed point, while minimizing a cost function. Thus, the purpose of unscented optimal control is to use the concept of the unscented transform to control the statistics of the propagation.

A fundamental unscented optimal control problem can be stated in a standard format as, $$X \in \mathbb{X}^{N_\sigma} \subseteq \mathbb{R}^{N_\sigma N_x}, u \in \mathbb{U} \subseteq \mathbb{R}^{N_x}$$

$$(U) \begin{cases} \text{Minimize} & J[X(\cdot), u(\cdot), t_f] := E(X(t_f), t_f) \\ \text{Subject to} & \dot{X}(t) = F(X(t), u(t), t) \\ & (X(t_0), t_0) = (X^0, t^0) \\ & e(X(t_f), t_f) \le 0 \\ & h(X(t), t) \le 0 \end{cases} \quad (2)$$

where $E: \mathbb{X}^{N_\sigma} \times \mathbb{R} \to \mathbb{R}$ is an endpoint cost function, $e: \mathbb{X}^{N_\sigma} \times \mathbb{R} \to \mathbb{R}^{N_e}$ is an endpoint constraint function that defines an endpoint set, and $h: \mathbb{X}^{N_\sigma} \times \mathbb{R} \to \mathbb{R}^{N_h}$ is a path function that constrains the entire collection of sigma-point trajectories to an allowable region. The endpoint cost function, the endpoint constraint function and the path functions may in some embodiments comprise weighted sums of the states for each sigma point dependent copy of the dynamical system. The cost function, the endpoint set, and the allowable region may all be chosen by the designer to achieve various outcomes.

An objective in unscented optimal control is the formulation of a problem for which a solution exists. Guaranteeing the existence of a solution to an optimal control problem is difficult but, in engineering practice, this problem can be overcome to thereby design algorithms and produce viable solutions because the physics of the problem can be used as a tool for design of a solvable problem.

Unscented optimal control is able to manage uncertainty even without the use of feedback if the problem formulation is carried out in a manner that ensures that a solution exists. Optimal control methods can be used to guarantee a computable solution under existence of certain hypotheses. Additionally, the chosen method should be capable of handling large dimensions (Na×Nx) and producing implementable control instructions.

Pseudo-spectral (PS) optimal control theory may be employed in one implementation of the invention. PS optimal control theory is able to provide some certainty as to the existence of a solution to the unscented control problem. Further, PS optimal control theory is capable of handling large dimensions and thus PS optimal control theory is well-suited for use in combination with unscented control.

PS optimal control theory overcomes limitations in the sensitivity of the system by algebraizing the differential equations while curbing the problem of dimensionality through spectral methods. Among the large number of available PS methods, two techniques, the Legendre and Chebyhsev PS methods, are the most suitable for optimal control, as well as for systems that use optimal control methods. These two PS methods avoid the possibility of producing false positives or divergence under mild conditions and these PS methods have mathematically provable convergence properties under existence assumptions.

If desirable, unscented control problems can be implemented in DIDO™, the MATLAB® tool for solving optimal control problems. The DIDO™ optimal control toolbox has been used previously with success for providing flight guidance in the aerospace industry. In the method described below, DIDO™ is used for generating both the open-loop control, as well as the unscented optimal control trajectory.

FIG. 1 is a flow chart showing an unscented control method 100 for implementation using an unscented control system. In an exemplary system, the method is implemented in a controller governing a system that requires unscented control to provide system control where limited or no feedback is available. In FIG. 1, in step 102 the system dynamics, defined by the equation 1, below are identified:

$$\dot{x} = f(x, u, t, \pi) \quad (1)$$

where x is the system state, u is the control vector, t is the time and π represents a vector comprising uncertain parameters, $\pi_i$.

In step 104 of the method of FIG. 1, the vectors of uncertain parameters and/or uncertain initial conditions are determined, with known joint distribution (Gaussian, uniform, etc.)

$$\Pi = [\pi_1, \ldots, \pi_{N_p}] \quad (2)$$

In step 106 of the method of FIG. 1, the sigma points P=[$\vec{P}_1, \ldots, \vec{P}_{N_\sigma}$] of $\Pi = [\pi_1, \ldots, \pi_{N_p}]$ and weights $w \in \mathbb{R}^{N_\sigma}$ are selected, with $\vec{P}_i \in \mathbb{R}^{N_p}$, calculated using an embodiment of the sigma point computation discussed in greater detail below. In step 108, a plurality of copies of the systems dynamical equations is computed giving rise to a state vector $$X(t) = \begin{bmatrix} \chi_1(t, u, \vec{P}_1) \\ \ldots \\ \chi_1(t, u, \vec{P}_{N_\sigma}) \end{bmatrix}.$$

In step 108, the sigma point computation uses a plurality of sigma points that precisely match the moments of the underlying statistical distribution of an uncertain variable. Preferred sigma point computations may use order 2 and/or order 3 sigma points to precisely match the first two/three moments of the underlying statistical distribution of an uncertain variable, respectively. Example statistical distributions include a Gaussian distribution, a uniform distribution or a combination thereof.

Order 3 sigma points and corresponding weights for a d-dimensional Gaussian distribution are easily constructed. In the real space, $\mathbb{R}^d$ there are 2d sigma points that exactly match all Gaussian Order 3 moments. These sigma points are given as the columns of the matrix equation 3 below, presuming a zero mean and unity variance. Each sigma point has a size given by $|P_i| = \sqrt{d}$ and the weight for each sigma point is given by $w_i = 1/(2d)$. The sigma points in equation 3 can be mapped to any mean and variance by a linear transformation.

$$Q = \begin{bmatrix} -\sqrt{d} & & & & \sqrt{d} & \\ & -\sqrt{d} & & & & \sqrt{d} \\ & & \ldots & & \ldots & \\ & & & -\sqrt{d} & \sqrt{d} & \end{bmatrix} \quad (3)$$

See e.g. Julier, S. J. and Uhlmann, J. K., "A consistent, debiased method for converting between polar and Cartesian coordinate systems," Proceedings of SPIE—The International Society for Optical Engineering, pp. 110-121 (1997).

There is also a preferred method for constructing Order 3 sigma points for a uniform distribution of any dimension, d. A uniform distribution has compact support, e.g. [−1, 1] for dimension 1, and it is important to ensure that the resulting sigma points fall within the compact support, e.g. $-1 \leq P_i \leq 1$. Without loss of generality, equation 4, shows a support for the uniform distribution:

$$I^d = \overbrace{I \times I \times \ldots \times I}^{d-times}, \text{ where } I = [\,-1 \quad 1\,] \quad (4)$$

There are 2d Order 3 sigma points for the uniform distribution and these points may be transformed to accommodate any support shifted from $I^d$ by applying a linear transformation of the Order 3 sigma points. Each Order 3 sigma point has a size $|P_i| = \sqrt{d/3}$, with an associated weight $w_i = 1/2d$. The matrix Q of 2d Order 3 sigma points for the uniform distribution is defined in equation 5:

$$Q = \begin{bmatrix} -\sqrt{d/3} & & & & \sqrt{d/3} & \\ & -\sqrt{d/3} & & & & \sqrt{d/3} \\ & & \ldots & & \ldots & \\ & & & -\sqrt{d/3} & \sqrt{d/3} & \end{bmatrix} \quad (5)$$

For dimension d>3, the Order 3 sigma points fall outside of the support $I^d$ because $\sqrt{d/3} > 1$. In a preferred embodiment of the present invention, the sigma points for d>3 should all be within the support $I^d$. To ensure that the support $I^d$ is satisfied, an orthogonal rotation matrix, M, is employed to provide the property that if $P = (p_{ij}) = MQ$, then $|p_{ij}| \leq 1$ and P is a matrix wherein the 2d columns of P are the order 3 uniform probability distribution of sigma points that lie within the support $I^d$. Therefore, as the dimension increases, the components of M are reduced in magnitude.

The column vectors in Q satisfy the Order 3 uniform distribution matching constraints on $I^d$. Columns outside the support $I^d$ do not match.

The orthogonal transformation M when applied to Q will force all components of P=MQ to have a magnitude smaller than 1. The resulting column vectors are sigma point vectors, which now lie within the support of the uniform distribution $I^d$. This is due to the orthogonality of the matrix M. Computation of the matrix M may be cast as a nonlinear optimization problem (NLP), P as shown in (6).

$$P \begin{cases} \text{Let } M = (m_{ij}) \in \mathbb{R}^d \times \mathbb{R}^d \\ \text{Then} \\ \min_{m_{ij}} J = norm(M) \\ \text{subject to the box bounds} \\ |m_{ij}| \le \sqrt{3/d} \\ \text{and the orthogonality constraint} \\ MM^T = M^T M = I \end{cases} \quad (6)$$

There is also an analytical method that can be used specifically for uniform distributions of dimensions 4 and 6, that employs the Givens transformation. By way of example, consider the rotation matrix:

$$G = \begin{pmatrix} \cos(\theta) & \sin(\theta) \\ -\sin(\theta) & \cos(\theta) \end{pmatrix}.$$

If this is an even vector space, $R^{2k}$, where k is a positive integer, the matrix;

$$M = \begin{pmatrix} G & 0 \\ 0 & I_{2k-2} \end{pmatrix}$$

may be constructed leading to the matrix product:

$$MD = \begin{pmatrix} G & 0 \\ 0 & I_{2k-2} \end{pmatrix} \begin{pmatrix} \sqrt{d/3} I_2 & 0 \\ 0 & I_{2k-2} \end{pmatrix}$$

The goal is to bound the components of the upper 2×2 block by 1. This is equivalent to the following constraints:

$$-1 \le \cos(\theta)\sqrt{\frac{d}{3}} \le +1 \qquad (7)$$

$$-1 \le \sin(\theta)\sqrt{\frac{d}{3}} \le +1$$

Assuming, without loss of generality, that $0 \le \theta \le \pi/2$, then the smallest value of $\theta$ may be chosen, for which $\cos(\theta) \le \sqrt{3/d}$, i.e., $\theta = \mathrm{acos}(\sqrt{3/d})$. It follows that $$\sin(\theta)\sqrt{d/3} = \sqrt{\frac{d-3}{3}}.$$

This quantity is bounded by 1 if and only if $d \le 6$. Hence if $d=4$ or $d=6$, the transform can be applied to compute the rotation matrix G.

Another approach to the uniform distribution problem is to construct a general orthogonal matrix with sufficiently small entries. A candidate example is shown in equation 8:

$$M = (m_{pq}), 1 \le p, q \le n \qquad (8)$$

$$m_{pq} = \sqrt{\frac{2}{n+1}} \sin\left(\frac{\pi pq}{n+1}\right)$$

Each entry in the candidate matrix is bounded (in absolute value) by $$\sqrt{\frac{2}{n+1}} < \sqrt{\frac{3}{n}},$$

and thus meets the size requirement.

The matrix should be shown to be orthogonal by illustrating that equation (9) is satisfied.

$$SE(p, q) = \sum_{k=1}^{n} \sin\left(\frac{\pi kp}{n+1}\right) \sin\left(\frac{\pi kq}{n+1}\right) = \begin{cases} 0, & p \ne q \\ \frac{n+1}{2}, & p = q \end{cases} \qquad (9)$$

The trigonometric identity, shown in equation 10, is employed to recast the terms of the matrix given in (8) as a simple linear combination of cosines:

$$\sin(x)\sin(y) = \frac{\cos(x-y)}{2} - \frac{\cos(x+y)}{2} \qquad (10)$$

$$\Rightarrow$$

$$E(p, q) = \sin\left(\frac{\pi kp}{n+1}\right) \sin\left(\frac{\pi kq}{n+1}\right) = \frac{\cos(\pi k(p-q))}{2} - \frac{\cos(\pi k(p+q))}{2}$$

Casting the resulting cosine in terms of complex exponentials, the following expressions of equation 11 are obtained:

$$E(p, q) = \frac{e^{-\frac{\pi k(p-q)i}{n+1}}}{4} + \frac{e^{\frac{\pi k(p-q)i}{n+1}}}{4} - \frac{e^{-\frac{\pi k(p+q)i}{n+1}}}{4} - \frac{e^{\frac{\pi k(p+q)i}{n+1}}}{4} \qquad (11)$$

$$SE(p, q) =$$

$$\sum_{k=1}^{n} E = \sum_{i=0}^{n} e^{-\frac{\pi k(p-q)i}{n+1}} + \sum_{i=0}^{n} e^{+\frac{\pi k(p-q)i}{n+1}} - \sum_{i=0}^{n} e^{-\frac{\pi k(p+q)i}{n+1}} - \sum_{i=0}^{n} e^{+\frac{\pi k(p+q)i}{n+1}}$$

These sums can be simplified if p=q, as shown in equation 12:

$$E(p,p) = \frac{e^{-\frac{\pi k 0 i}{n+1}}}{4} + \frac{e^{\frac{\pi k 0 i}{n+1}}}{4} - \frac{e^{-\frac{2\pi k p i}{n+1}}}{4} - \frac{e^{\frac{2\pi k p i}{n+1}}}{4} \quad (12)$$

and $$SE(p,p) = \frac{n}{4} + \frac{n}{4} - \frac{\left(-1 + \sum_{i=0}^{n} e^{-\frac{2\pi k p i}{n+1}}\right)}{4} - \frac{\left(-1 + \sum_{i=0}^{n} e^{+\frac{2\pi k p i}{n+1}}\right)}{4}$$

The exponential sums in equation 12 can be viewed as a geometric series, and thus have very simple expressions, as shown in equation 13.

$$\sum_{i=0}^{n} e^{-\frac{2\pi k p i}{n+1}} = \frac{1 - e^{-2\pi p i}}{1 - e^{-\frac{2\pi p i}{n+1}}} = 0, \; 1 < p < n+1 \quad (13)$$

$$\sum_{i=0}^{n} e^{+\frac{2\pi k p i}{n+1}} = \frac{1 - e^{+2\pi p i}}{1 - e^{+\frac{2\pi p i}{n+1}}} = 0, \; 1 < p < n+1$$

It follows that $$E(p,p) = \frac{n+1}{2}.$$

Also, all of the rows (and columns, by symmetry) of the candidate matrix, M, have unit magnitude. Next, it is demonstrated that the rows (resp. columns) are orthogonal by showing that SE(p,q)=0 if p≠q. The exponential sums to be analyzed are displayed in equation 14:

$$\sum_{i=0}^{n} e^{-\frac{\pi k(p-q)i}{n+1}} = \frac{1 - e^{-\pi(p-q)i}}{1 - e^{-\frac{\pi(p-q)i}{n+1}}} \quad (14)$$

$$\sum_{i=0}^{n} e^{+\frac{\pi k(p-q)i}{n+1}} = \frac{1 - e^{+\pi(p-q)i}}{1 - e^{+\frac{\pi(p-q)i}{n+1}}}$$

$$\sum_{i=0}^{n} e^{-\frac{\pi k(p+q)i}{n+1}} = \frac{1 - e^{-\pi(p+q)i}}{1 - e^{-\frac{\pi(p+q)i}{n+1}}}$$

$$\sum_{i=0}^{n} e^{+\frac{\pi k(p+q)i}{n+1}} = \frac{1 - e^{+\pi(p+q)i}}{1 - e^{+\frac{\pi(p+q)i}{n+1}}}$$

If $p+q \in 2\mathbb{Z}$ ($\Rightarrow p-q \in 2\mathbb{Z}$), where $\mathbb{Z}$ is the set of integers, then each of the exponential sums in equation 14 is zero. It follows that E(p,q)=0. Otherwise, without loss of generality, it may be assumed that p is even and q is odd. With this assumption, each of the exponential sums that occur in E(p,q) is computed, as shown in equations 15:

$$SE1(p,q) = \sum_{i=0}^{n} e^{-\frac{\pi k(p-q)i}{n+1}} = \frac{1 - e^{-\pi(p-q)i}}{1 - e^{-\frac{\pi(p-q)i}{n+1}}} = \frac{1 - e^{+\pi q i}}{1 - e^{\frac{\pi q i}{n+1}}} = \frac{2}{1 - e^{\frac{\pi q i}{n+1}}} \quad (15)$$

$$SE2(p,q) = \sum_{i=0}^{n} e^{+\frac{\pi k(p-q)i}{n+1}} = \frac{1 - e^{+\pi(p-q)i}}{1 - e^{+\frac{\pi(p-q)i}{n+1}}} = \frac{1 - e^{-\pi q i}}{1 - e^{\frac{-\pi q i}{n+1}}} = \frac{2}{1 - e^{-\frac{\pi q i}{n+1}}}$$

$$SE3(p,q) = \sum_{i=0}^{n} e^{-\frac{\pi k(p+q)i}{n+1}} = \frac{1 - e^{-\pi(p+q)i}}{1 - e^{-\frac{\pi(p+q)i}{n+1}}} = \frac{1 - e^{-\pi q i}}{1 - e^{\frac{-\pi q i}{n+1}}} = \frac{2}{1 - e^{-\frac{\pi q i}{n+1}}}$$

$$SE4(p,q) = \sum_{i=0}^{n} e^{+\frac{\pi k(p+q)i}{n+1}} = \frac{1 - e^{+\pi(p+q)i}}{1 - e^{+\frac{\pi(p+q)i}{n+1}}} = \frac{1 - e^{+\pi q i}}{1 - e^{\frac{+\pi q i}{n+1}}} = \frac{2}{1 - e^{+\frac{\pi q i}{n+1}}}$$

Then, $$SE(p,q) = SE1(p,q) + SE2(p,q) + SE3(p,q) + SE4(p,q)$$

$$= -1 + \frac{2}{1 - e^{\frac{\pi q i}{n+1}}} - 1 + \frac{2}{1 - e^{-\frac{\pi q i}{n+1}}} + 1 - \frac{2}{1 - e^{-\frac{\pi q i}{n+1}}} +$$

$$1 - \frac{2}{1 - e^{+\frac{\pi q i}{n+1}}}$$

$$= 0$$

A seven dimensional example of the Order 3 uniform sigma points computed by way of the present invention is shown in Table 1. The rotation matrix values are bounded by $\sqrt{2}/8 = 0.5$.

TABLE 1

| Exemplary 7 × 7 rotation matrix (M) | | | | | | |
|---|---|---|---|---|---|---|
| 0.19134 | 0.35355 | 0.46194 | 0.50000 | 0.46194 | 0.35355 | 0.19134 |
| 0.35355 | 0.50000 | 0.35355 | 0.00000 | −0.35355 | −0.50000 | −0.35355 |
| 0.46194 | 0.35355 | −0.19134 | −0.50000 | −0.19134 | 0.35355 | 0.46194 |
| 0.50000 | 0.00000 | −0.50000 | 0.00000 | 0.50000 | 0.00000 | −0.50000 |
| 0.46194 | −0.35355 | −0.19134 | 0.50000 | −0.19134 | −0.35355 | 0.46194 |
| 0.35355 | −0.50000 | 0.35355 | 0.00000 | −0.35355 | 0.50000 | −0.35355 |
| 0.19134 | −0.35355 | 0.46194 | −0.50000 | 0.46194 | −0.35355 | 0.19134 |
| Exemplary Order 3 Uniform Sigma Points for d = 7 | | | | | | |
| −0.29228 | −0.54006 | −0.70562 | −0.76376 | −0.70562 | −0.54006 | −0.29228 |
| 0.29228 | 0.54006 | 0.70562 | 0.76376 | 0.70562 | 0.54006 | 0.29228 |
| −0.54006 | −0.76376 | −0.54006 | 0.00000 | 0.54006 | 0.76376 | 0.54006 |
| −0.54006 | −0.76376 | −0.54006 | 0.00000 | 0.54006 | 0.76376 | 0.54006 |
| −0.70562 | −0.54006 | 0.29228 | 0.76376 | 0.29228 | −0.54006 | −0.70562 |
| 0.70562 | 0.54006 | −0.29228 | −0.76376 | −0.29228 | 0.54006 | 0.70562 |
| −0.76376 | 0.00000 | 0.76376 | 0.00000 | −0.76376 | 0.00000 | 0.76376 |
| −0.76376 | 0.00000 | 0.76376 | 0.00000 | −0.76376 | 0.00000 | 0.76376 |
| −0.70562 | 0.54006 | 0.29228 | −0.76376 | 0.29228 | 0.54006 | −0.70562 |
| 0.70562 | −0.54006 | −0.29228 | 0.76376 | −0.29228 | −0.54006 | 0.70562 |
| −0.54006 | 0.76376 | −0.54006 | 0.00000 | 0.54006 | −0.76376 | 0.54006 |
| −0.54006 | 0.76376 | −0.54006 | 0.00000 | 0.54006 | −0.76376 | 0.54006 |

TABLE 1-continued

| -0.29228 | 0.54006 | -0.70562 | 0.76376 | -0.70562 | 0.54006 | -0.29228 |
|---|---|---|---|---|---|---|
| 0.29228 | -0.54006 | 0.70562 | -0.76376 | 0.70562 | -0.54006 | 0.29228 |

Returning to FIG. 1, in step 108, $N_\sigma$ copies of the system dynamics are created. In some embodiments, two copies of the system dynamics are sufficient. However, in some other situations, a minimum of three, four, five, six or seven copies of the system dynamics may be required. In still other embodiments, even more copies of the system dynamics may be required or additional precision in the control system may be obtainable by use of additional copies of the system dynamics. This is represented by equation 16 below:

$$\dot{X}(t) = \begin{bmatrix} \dot{\chi}_1 \\ \dot{\chi}_2 \\ \vdots \\ \dot{\chi}_{N\sigma} \end{bmatrix} = \begin{bmatrix} f(\chi_1) \\ f(\chi_2) \\ \vdots \\ f(\chi_{N\sigma}) \end{bmatrix} \quad (16)$$

$f(\chi)=f(x,u,t, P)$ is a deterministic function or a vector of a deterministic functions of a variable that models the dynamical behavior of the system.

In step 110 of FIG. 1, the end point conditions, or outcomes, $e_L \le e(X(t_0),t_0) \le e^U$ and/or $e_L \le e(X(t_f),t_f) \le e^U$, box bounds, $X_L \le X \le X^U$ and/or $u_L \le u \le u^U$, path constraints, $h_L \le h(X(t),u(t), t) \le h^U$ and the cost function $J=E(X(t_0,t_f)+\int_{t_o}^{t_f} F(X(t), u(t), t)dt$ are established.

Any or all of the end point conditions or outcomes, box bounds, path constraints and the cost function may be weighted functions of the sigma points of the unscented transform. In one embodiment, one or more of the end point conditions or outcomes, box bounds, path constraints and the cost function satisfy the weighted function of equation 17:

$$g_L(X(t)) \le \Sigma_{i=1}^{N\sigma} w_i X_i(t) \le g^U(X(t)) \quad (17)$$

representing mean values or combinations of mean values of the system states $X(t)$, wherein the bounds, gL and gU are each vectors whose individual entries may be functions of $X(t)$, or constants, or zero, P is a matrix of sigma points, w is a vector of weights associated with sigma points and $N\sigma$ is the number of sigma points.

Alternatively, one or more of the end point conditions, box bounds, path constraints and the cost function satisfy the weighted function of equation 18:

$$h_L(X(t)) \le \Sigma_{i=1}^{N\sigma} w_i(X_i(t)-\mu_i)(X_i(t)-\mu_i)^T \le h^U(X(t)) \quad (18)$$

representing constraints on the covariance of the system states $X(t)$, or combinations thereof, bounds hL and hU are matrices whose individual entries may be functions of $X(t)$, or constants, or zero, P is a matrix of sigma points, w is a vector of weights associated with sigma points and $N\sigma$ is the number of sigma points.

The end point conditions are the conditions that should be achieved by the system. The function e is an endpoint function or a vector of endpoint functions whose values depend on the values of the state vectors at an initial time $t_0$ or a final time $t_f$.

The box bounds are additional constraints placed on the system. In relation to the box bounds, $X_L$ is a vector of lower limits on the possible values of variables in vector X. $X^U$ is a vector of upper limits on the possible values of variables in vector X. $u_L$ is a vector of lower limits on the possible values of the control variables in vector u. $u_U$ is a vector of upper limits on the possible values of the control variables in vector u.

The path constraints are another type of constraint placed on the system. In relation to the path constraints, h is a vector of functions whose values depend on the values of the state variables in vector X at time t and/or the values of the control variables in vector u at time t.

In some embodiments some or all of the end point conditions, box bounds, path constraints and the cost function satisfy one of the weighted functions of the sigma points set forth above in equations (17)-(18). In some embodiments, one or more of the end point conditions or outcomes satisfy one of the weighted functions of the sigma points set forth above in equations (17)-(18). In some embodiments, one or more of the box bounds satisfy one of the weighted functions of the sigma points set forth above in equations (17)-(18). In some embodiments, one or more of the path constraints satisfy one of the weighted functions of the sigma points set forth above in equations (17)-(18).

In the cost function, E is an endpoint cost function whose value depends on the values of the state variables in vector X at an initial time and/or a final time. F is a running cost functional whose value at time t depends on the integral of the function F from an initial time $t_0$ to a final time $t_f$. The value of function F at a particular time depends on the values of the state variables in vector X and/or the values of the control variables in vector u and/or time t.

The function E may also be constructed based on the weighted sum of the sigma points, e.g. to minimize the mean value of the terminal states as follows $$E=\Sigma_{i=1}^{N\sigma} w_i X_i(t_f) \quad (20)$$

or $$E=\Sigma_{i=1}^{N\sigma} w_i(X_i(t_f)-\mu_i(t_f))(X_i(t_f)-\mu_i(t_f))^T \quad (19)$$

Or the above formulas may be applied selectively to particular values in the vector X, such as the trace of the covariance matrix The function F may also be constructed based on the weighted sum of the sigma points, e.g. to minimize the dispersion of the states over an entire trajectory. In this embodiment:

$$F=\Sigma_{i=1}^{N\sigma} w_i(X_i(t_f)-\mu_i(t_f))(X_i(t_f)-\mu_i(t_f))^T \quad (20).$$

In step 112 of FIG. 1, the unscented optimal control computations are performed. In performing these computations the relationships shown in equation 21 below are used:

$$U: \begin{cases} \text{Minimize} \quad J = E(X(t_o), Xt_f) + \int_{t_o}^{t_f} F(X(t), u(t), t)\, dt \\ \text{Subject to} \quad \dot{X}(t) = \begin{bmatrix} f(\chi_1) \\ f(\chi_2) \\ \vdots \\ f(\chi_{N\sigma}) \end{bmatrix} \\ e_L \le e(X(t_o), t_o) \le e^U \\ g_L \le g(X(t_f), t_f) \le g^U \\ h_L \le h(X(t), u(t), t) \le h^U \end{cases} \quad (21)$$

In constructing problem U, the terminal constraints e and/or g, and/or the path constraints, h, and/or the cost functionals E and/or F may be weighted functions of the sigma points as described previously. Preferably, in performing the optimal control computation the solution to problem U is obtained by using Pseudo-spectral optimal control theory.

In step 114 of FIG. 1, the solution to the optimal control computation is used to generate the unscented optimal control history. In step 116 of FIG. 1, this history is used to provide control signals to the system modeled by the system dynamic equations.

The unscented control method may be implemented in any suitable system that requires a control trajectory as either the primary or sole control means, or as a supplemental or partial control means used in combination with, for example, a feedback control system. Exemplary devices in which the control system of the invention may be implemented include systems such as space and aerospace systems, mechanical systems, hydraulic and pneumatic systems and for the command and control of unmanned and autonomous systems, for example, in a navigation system. Unscented optimal control may be applied in satellites, aircraft, rockets, robots, automobiles, heavy machinery engines, chassis systems, hydraulic equipment, pneumatic equipment, unmanned systems, autonomous systems, chemical processes, energy conservation systems, quantum systems, financial and epidemic/biological systems, among other systems.

The invention also relates to a control system that includes a controller configured to implement at least one of the unscented control methods of the present invention. The control system may be configured for control of a device or a component of a device selected from satellites, aircraft, rockets, robots, automobiles, heavy machinery engines, chassis systems, hydraulic systems, pneumatic systems, unmanned systems, autonomous systems, chemical processes, energy conservation systems, navigation systems, quantum systems, financial and epidemic/biological systems. The control system may be an open loop control system or may be a supplemental or backup control system for a feedback control system.

Figure 2:
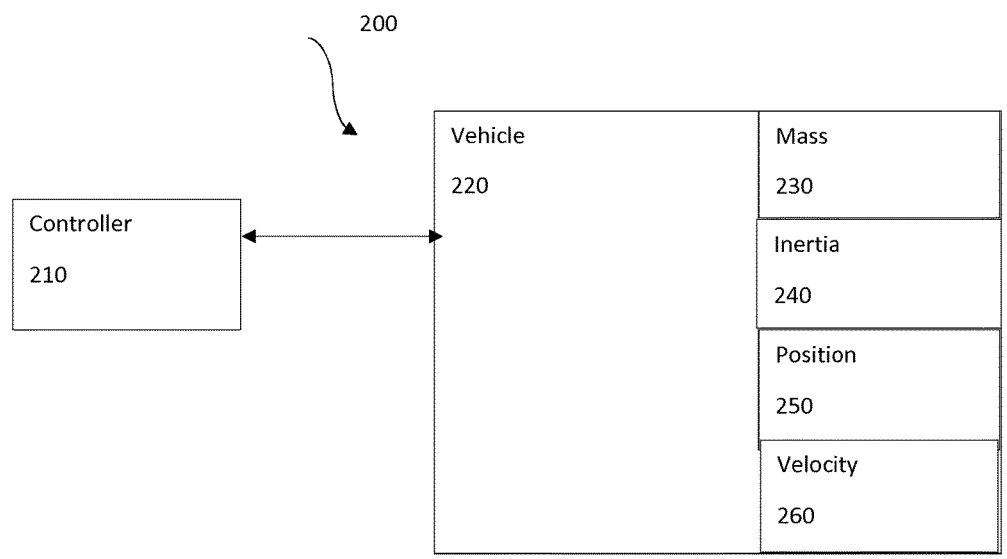
FIG. 2 is a simplified diagram of a navigation system in which unscented optimal control can be implemented.

The unscented control system will now be illustrated in the context of a navigation system. FIG. 2 shows a guidance system 200 including a controller 210 in which the unscented control method is implemented. Controller 210 may be a processor, a collection of processors, or a device able to issue control signals to the system being controlled. Vehicle 220 is operably connected to controller 210. Controller 210 may be located within vehicle 220, be located remotely from vehicle 220 or be part of a controller 210 that is distributed so that part of controller 210 is located remotely and part of the controller is located in the vehicle.

Vehicle 220 may be, for example, a plane, satellite, space vehicle, space object or other object. Vehicle 220 may have a plurality of parameters that govern the state of the system, such as mass, inertia, initial position, and initial velocity. System 200 may include one or more sub-modules, i.e. mass module 230, inertia 240, position module 250 and velocity module 260. Each of these sub-modules may correspond to a parameter of the dynamic system.

In vehicle 220 the unscented control method 100 is implemented so that controller 210 is able to provide control signals to vehicle 220 that are able to achieve the control outcomes without the use of feedback, though the system can also be used in combination with or as a backup for a feedback control system.

The invention will now be further illustrated by the following non-limiting examples.

EXAMPLES

Example 1—Control of the Hubble Space Telescope (HST)

Figure 3:
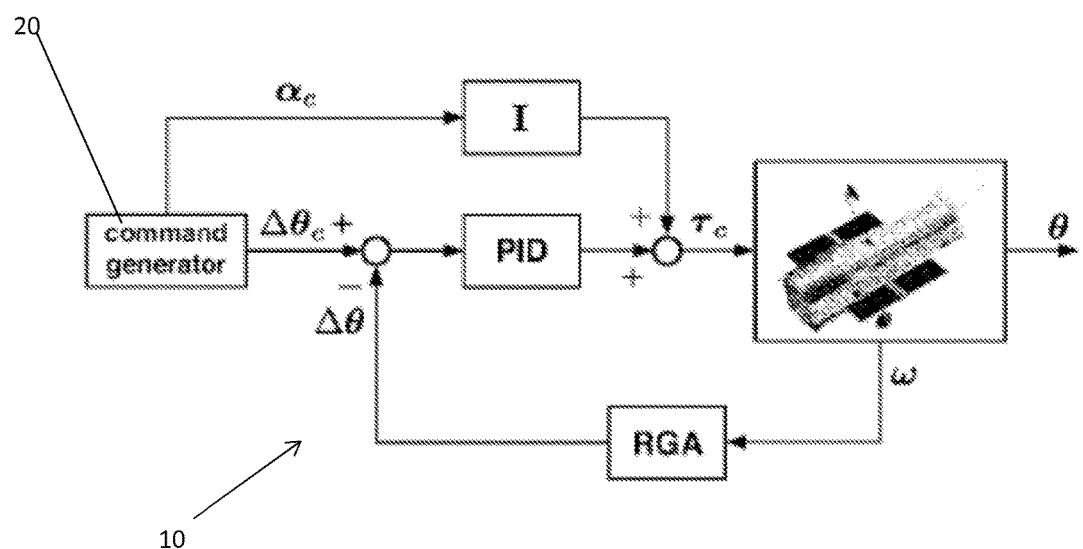
FIG. 3 shows a simplified block diagram of the Hubble Space Telescope's pointing control system.
Figure 4:
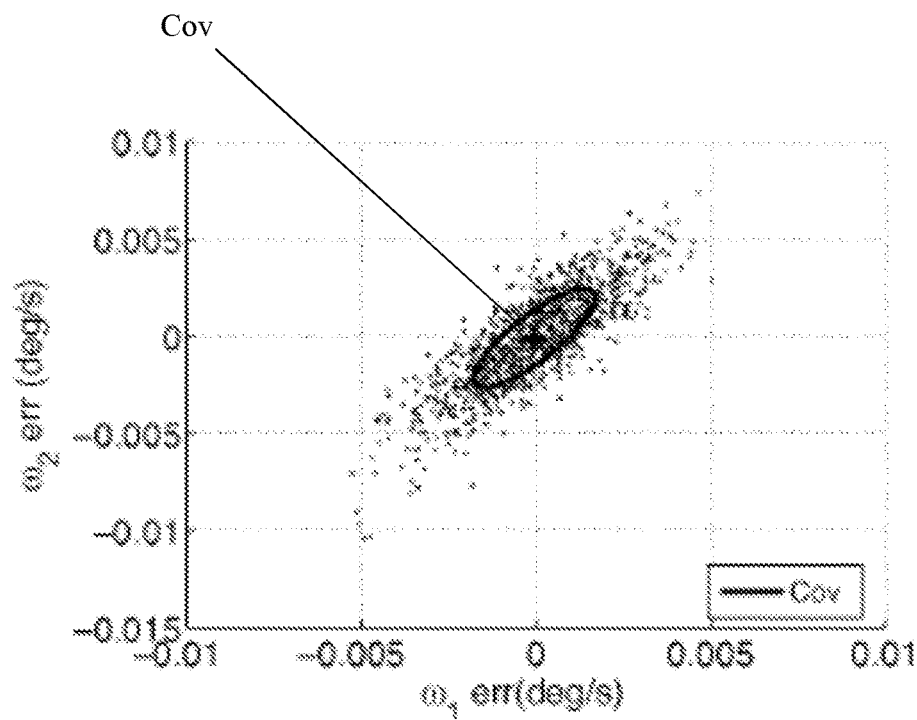
FIG. 4 is a graph showing target error distributions produced in Example 1 from a Monte Carlo simulation of a shortest-time-maneuver implementation for the Hubble Space Telescope operating in an open loop zero-gyro mode with system inertia uncertainty.
Figure 5:
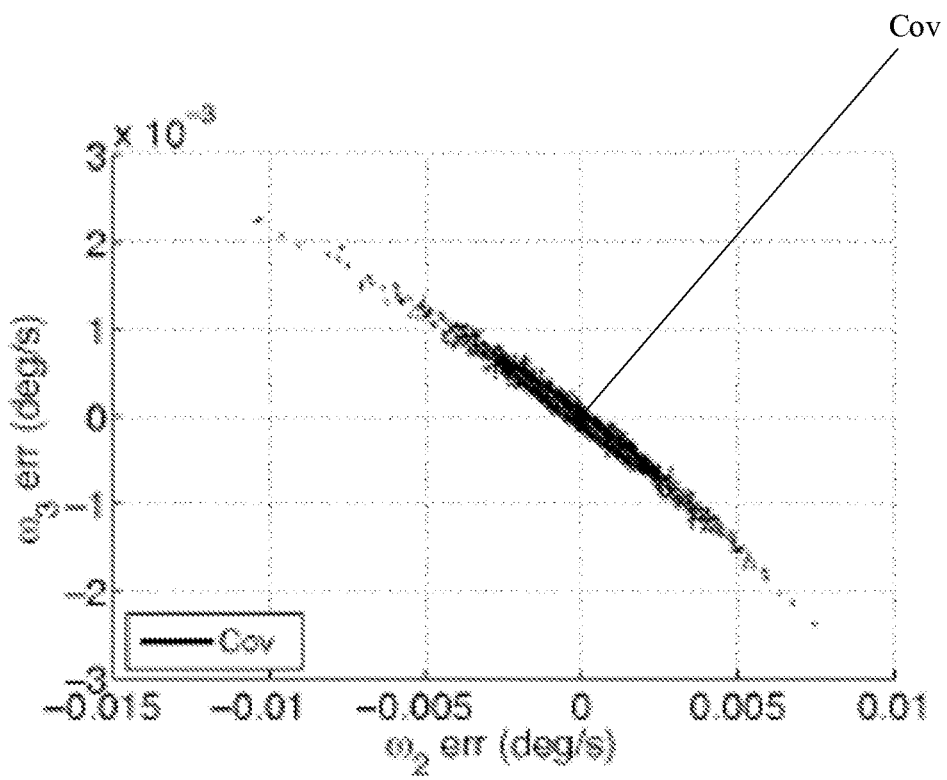
FIG. 5 is graph showing additional target error distributions produced in Example 1 from a Monte Carlo simulation of a shortest-time-maneuver implementation for the Hubble Space Telescope operating in an open loop zero-gyro mode with system inertia uncertainty.
Figure 6:
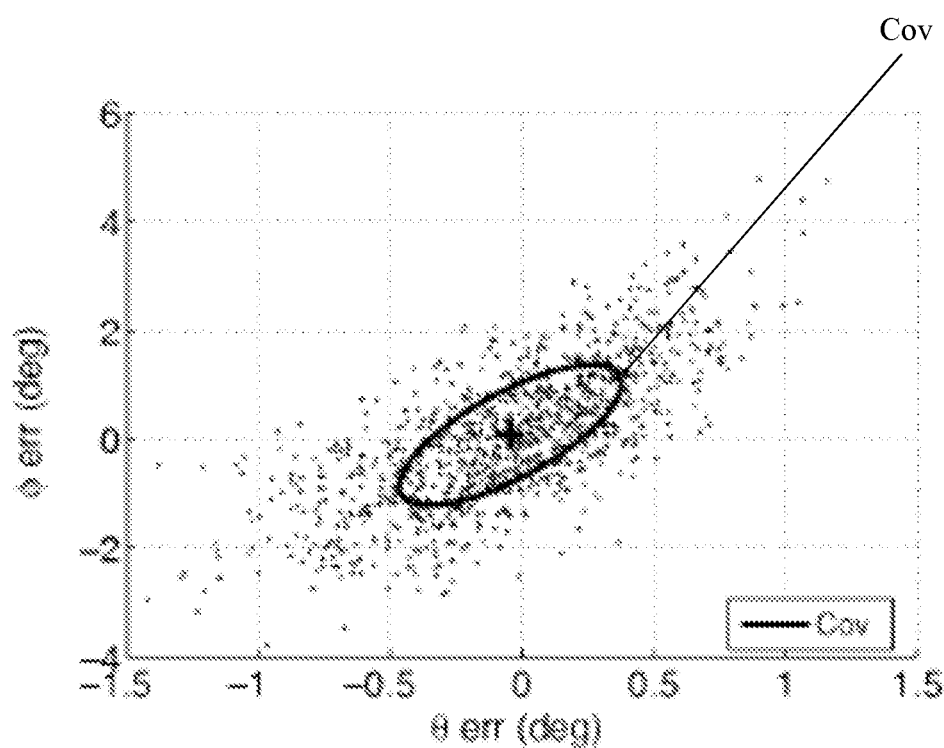
FIG. 6 is a third graph showing target error distributions produced in Example 1 from a Monte Carlo simulation of a shortest-time-maneuver implementation for the Hubble Space Telescope operating in an open loop zero-gyro mode with system inertia uncertainty.
Figure 7:
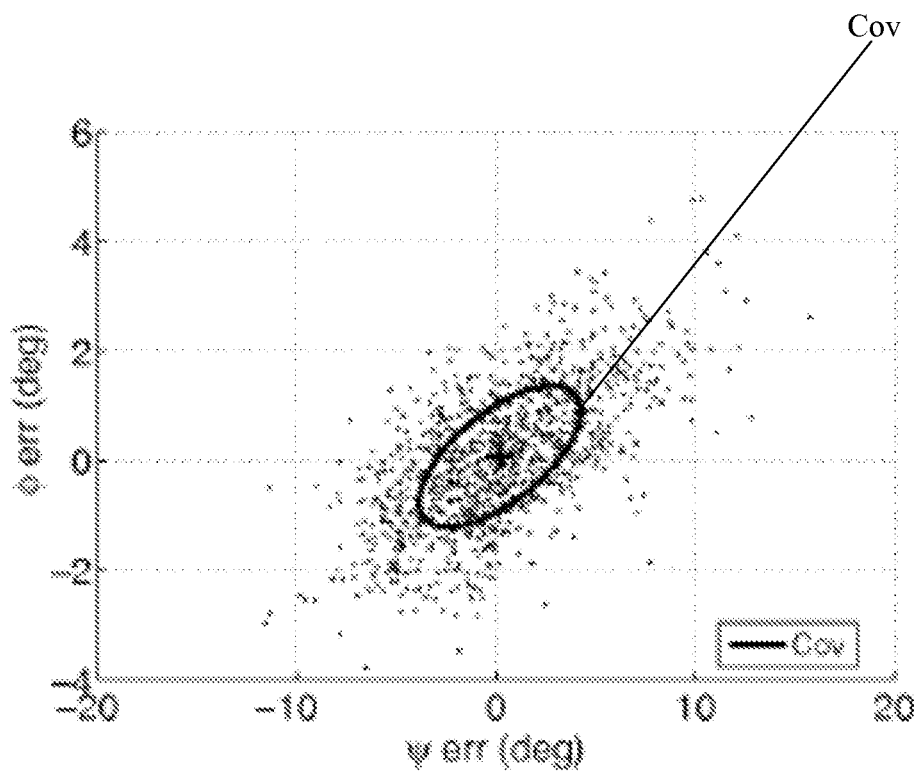
FIG. 7 is a fourth graph showing target error distributions produced in Example 1 from a Monte Carlo simulation of a shortest-time-maneuver implementation for the Hubble Space Telescope operating in an open loop zero-gyro mode with system inertia uncertainty.

Referring to FIG. 3, in a normal functioning mode, the Hubble Space Telescope (HST) 10 is a spacecraft that performs an eigenaxis slew between two points of interest using gyros that provide information for feedback control. Solar-exclusion zones are managed using dog-leg maneuvers. Such constraints are handled through the use of optimal control techniques including the present unscented control. The gyros onboard HST 10 provide feedback signals that are used for slewing while the fine guidance sensors provide accurate information used for precision pointing.

Prior to 2001, normal operations of HST 10 required four functioning gyros that allowed autonomous operation of HST 10 in case of a single gyro failure. In its long history, some of the gyros have failed and have been replaced by servicing missions. With the cancellation of these servicing missions, multiple gyro failures could doom the mission of HST 10 even though the science instruments may still be operational.

Starting in 2001, the HST project began operations in a three-gyro mode. While this has no effect on performance, gyro anomalies occasionally result in a temporary halt to science activities. In anticipation of additional gyro failures, the HST project has developed a two-gyro science (TGS) mode. In TGS mode, the rate information formerly provided by the third gyro is provided by other sensors such as magnetometers, star trackers and field guidance sensors. Because of their widely different sensor characteristics, three sub-modes have been defined within the TGS. Although there is no degradation in image quality in the TGS mode, there is a reduction in science productivity due to difficulties encountered in target scheduling and constraints imposed by the star trackers. A single-gyro science mode is also theoretically possible but this expected to have a further detrimental impact on the HST's science return.

FIG. 3 shows a simplified block diagram of the Hubble Space Telescope's pointing control system. In FIG. 3, matrix I represents the inertia tensor of the HST 10. The components of $I=[I_{xx},I_{xy},I_{xz};I_{xy},I_{yy},I_{yz};I_{xz},I_{yz},I_{zz}]$ are the space vehicle moments of inertia. PID in FIG. 3 is the proportional integral derivative control law, which is a feedback control structure that is commonly utilized in the control of space and other mechanical and electrical systems. RGA is the rate-gyro-assembly, which comprises a plurality of rate measurement devices that are used to sense and determine the rotational rate of the HST 10. $\alpha_c$ is the commanded acceleration that may vary over time and is provided to the HST 10 attitude control system by a command generator 20. $\omega$ is the vector of HST 10 rates that are sensed or measured using the RGA, and $\theta$ is an estimated attitude angle or change in attitude angle of the space vehicle derived from measurements of the rates of HST 10. $\theta_c$ is the commanded attitude angle or change in attitude angle of the HST 10 that is provided to the attitude control system by the command generator 20 and which may vary over time. $\tau_c$ is a vector of commanded torques that may vary over time and which is applied to the HST 10 by the on board actuation system.

The commanded torques may be computed as the sum of a feed-forward acceleration signal multiplied by the inertia tensor of the HST 10 and the output of the PID control law, or as the output of the PID control law only, or as a feed-forward acceleration signal multiplied by the space vehicle inertia tensor, or as a vector of feed-forward torque command trajectories computed using an embodiment of the present invention.

A command generator 20 generates commands for four reaction wheel assemblies, which generate command control torques. Along any axis, assume it is possible to command a maximum torque of 0.95 Nm, with some margin left for managing uncertainties. The torque is generated by a momentum exchange between the reaction wheel assemblies and the main body of HST 10. The maximum angular velocity of HST 10 is assumed to be limited to 0.15 deg/s. The nominal principal moments of inertia for HST 10 are given by, $(Ixx, Iyy, Izz)=(I_1, I_2, I_3)=(3.6, 8.7, 9.4) \times 10^4$ Kg·m². The off diagonal terms are assumed to be zero, but non-zero entries do not limit the successful application of the invention. Non-zero entries only serve to complicate the system dynamical equations. The solution of the unscented optimal control is transparent to this increased complexity and the process of the present invention will naturally accommodate such non-zero entries.

Initially, the attitude of HST 10 is estimated by the flight guidance system to an accuracy of 90 arc seconds. The main unknowns for the slew are therefore not the initial quaternions. Despite the precision in initial knowledge, in the absence of feedback from gyros, HST 10 as presently implemented will not be able to follow the commands produced by the command generator 20. This is because the command generator 20 may produce signals that are not dynamically feasible. This issue is normally accommodated by the feedback control law.

The shortest-time-maneuver (STM) is a flight implementable method that solves a number of challenges through the application of optimal control techniques. Unlike the command generator 20 of HST 10, STM commands are dynamically feasible and can execute a slew in a zero gyro mode with HST 10 with correct knowledge of the initial states, inertia tensor and zero disturbances. Although the initial states are known to a very high precision, a pure STM command is generally not a viable option for slewing because the unknowns for HST 10 are: (1) the inertia tensor, (2) the gravity gradient, and (3) the atmospheric torques. These unknowns can cause the space vehicle to drift away from the STM attitudes if the control toruqes are implemented in the open loop.

The first step in implementing the unscented optimal control of the present invention in this context is to quantify the effects of these three unknowns. For this purpose, an STM is simulated using a Monte Carlo simulation of the Hubble Space Telescope operating in an open loop zero-gyro mode with system inertia uncertainty.

The state of HST 10 can be represented by, $$x = \begin{bmatrix} q \\ \omega \end{bmatrix} \in \mathbb{R}^7 \quad (22)$$

where q and ω are the familiar quaternions and body rates. Then, the nonlinear dynamics, $\dot{x}=f(x, u)$, are given by the equation:

$$\dot{q}_1 = \frac{1}{2}[\omega_1 q_4 - \omega_2 q_3 + \omega_3 q_2] \quad (23)$$

$$\dot{q}_2 = \frac{1}{2}[\omega_1 q_3 + \omega_2 q_4 - \omega_3 q_1]$$

$$\dot{q}_3 = \frac{1}{2}[-\omega_1 q_2 + \omega_2 q_1 + \omega_3 q_4]$$

$$\dot{q}_4 = \frac{1}{2}[-\omega_1 q_1 - \omega_2 q_2 - \omega_3 q_3]$$

$$\dot{\omega}_1 = \frac{u_1}{I_1} - \left(\frac{I_3 - I_2}{I_1}\right)\omega_2 \omega_3$$

$$\dot{\omega}_2 = \frac{u_2}{I_2} - \left(\frac{I_1 - I_3}{I_2}\right)\omega_1 \omega_3$$

$$\dot{\omega}_3 = \frac{u_3}{I_3} - \left(\frac{I_1 - I_2}{I_3}\right)\omega_1 \omega_2$$

The state and control spaces for a feasible slew of HST 10 is given by, $$\mathbb{X} : \{x \in \mathbb{R}^7 : \|q\|_2 = 1, \|\omega\|_2 \leq \omega_{max}\} \quad (24)$$

$$\mathbb{U} : \{u \in \mathbb{R}^3 : \|u\|_2 \leq u_{max}\} \quad (25)$$

The standard STM problem is to find the state-control function pair, $t \to (x, u) \in \mathbb{X} \times \mathbb{U}$, that drives the vehicle from its initial position, $x(t0)=X^0$ to its target position given by $x(t_f)=x_f$ while minimizing the cost function, $$J[x(\cdot), u(\cdot), t_f] := t_f - t_0 \quad (26)$$

The boundary conditions corresponding to a large-angle-maneuver are considered and are given by, $$x^0 = [0,0,0,1,0,0,0]^T$$

$$x^f = [-0.27060, 0.27060, 065328, 0.65328, 0, 0, 0]^T \quad (27)$$

These numbers correspond to a yaw of ψ=90 degrees, a pitch of θ=45 degrees and zero roll (Φ).

For flight implementation, the impact of all of the unknowns is preferably considered. In pre-flight analysis, the impact of each of the unknowns should be considered separately. For this reason, the impact of a 3.3%, 1σ Gaussian uncertainty in the principal moments of inertia was assessed.

FIGS. 4-7 show the errors in the targeted angular position and velocity generated from 1000 Monte Carlo simulations of the Hubble Space Telescope operating in an open loop zero-gyro mode with system inertia uncertainty. The errors are the deviations from xf given in (25) when the STM is implemented in the open-loop. From the statistics of the errors provided in Table 2 below, the mean angular velocity is off of its targeted value by about 0.2 arcsec/s, while the mean angular position is off by 741 arcsec. The covariances for the angular velocity and mean angular position are shown by the ellipses in FIGS. 6-7. Based on this simulation, HST 10 would not be able to perform its mission in an open-loop, zero-gyro framework using this control method. This is because the errors due to the inertia uncertainty are too large. Thus, a first step in developing a zero-gyro framework is to employ the unscented control method of the present invention is to target a zero mean error.

TABLE 2

| Target Parameter | Error Mean | Standard Deviation |
|---|---|---|
| $\omega_1$ (arcsec/s) | −0.197 | 6.26 |
| $\omega_2$ (arcsec/s) | −0.356 | 9.18 |
| $\omega_3$ (arcsec/s) | −0.063 | 2.43 |
| ψ (arcsec) | 666.0 | 14,616 |
| θ (arcsec) | −158.0 | 1519 |
| φ (arcsec) | 284.0 | 4644 |

It is assumed that there is no uncertainty in the initial states and thus, x:=(q, ω), as a result of the availability of the flight guidance system. Hence, the dynamical model of HST 10 can be parameterized by uncertainties in the three principal moments of inertia, $$\dot{x}=f(x,u;I_1,I_2,I_3) \quad (28)$$

From Julier's second order minimal simplex method Nσ=5. See Julier, S. J., "The Spherical Simplex Unscented Transformation," Proceedings of the American Control Conference, Denver, Colo., Jun. 4-6, 2003, Vol. 3, Pages 2430-2434, the disclosure of which is hereby incorporated by reference in its entirety for the purpose of describing the algorithm of the unscented transform.

Hence, the state space for the unscented optimal control problem is $\mathbb{X}^5 = \mathbb{R}^{35}$ for HST 10. The state variable, X, comprises five copies of the (q, ω) states vector. Each of these five copies of the state vector starts at the same initial point, $\chi_j(t_0)=x^0$, j=1, ..., 5, each with the same dynamical law but with five different velocities the precise values of which will depend on the inertia parameters as expressed in terms of the Nσ=5 sigma points representing the three dimensional uncertainty in the space vehicle inertia $$\dot{\chi}_j = f(\chi_j, u; I_1^j, I_2^j, I_3^j) j=1, \ldots, 5 \quad (29)$$

where $I_1^j, I_2^j, I_3^j$, j=1, ..., 5 are the values of the principal moments of inertia that correspond to the five sigma points. Each evolution of the state trajectory, $t \mapsto \chi_j$, must satisfy the state-space constraints, $$\{\chi_j(t)=(q_j(t),\omega_j(t)) : \|q_j(t)\|_2=1, \|\omega_j(t)\|_2 \le \omega_{max}\}$$
$$\forall j=1, \ldots, 5 \quad (30)$$

The evolutions of the state trajectories, for each of the Nσ=5 sigma points, are then driven in such a way that the final value of the mean sigma-point vector, $u_{\mu_x}(t_f) = \Sigma_{i=1}^{N\sigma} w_i X_i(t_f)$, is equal to the target value given by $x^f$. Using the unscented optimal control framework, therefore, the final-time conditions should satisfy the equality constraint, $$e(X(t_f)) := \mu_x(t_f) - x^f = 0 \quad (31)$$

Figure 8:
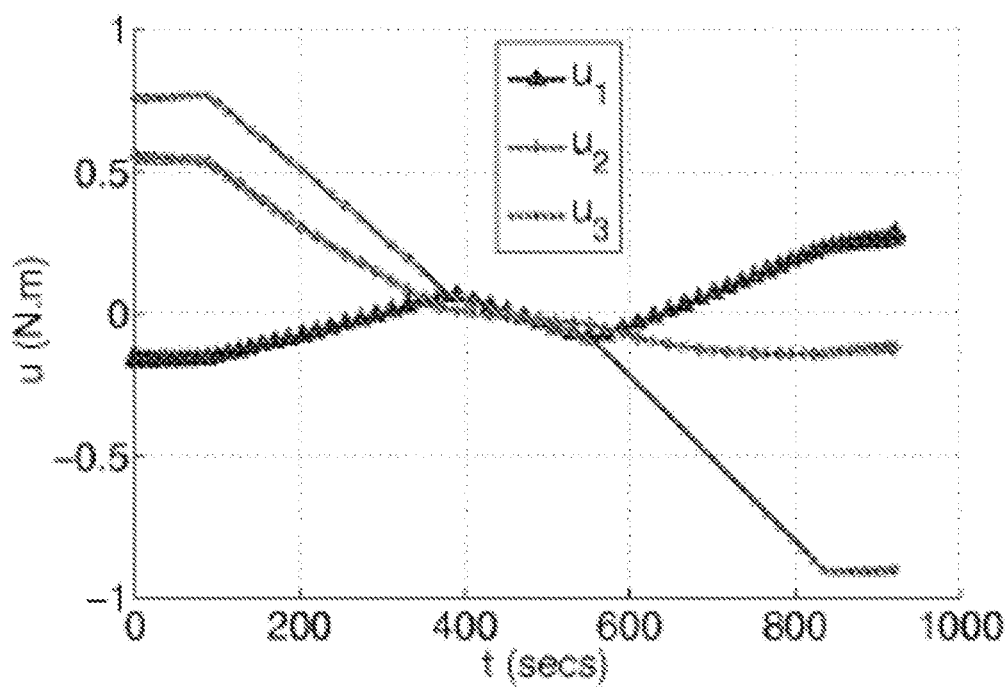
FIG. 8 is a graph showing an exemplary unscented optimal control for targeting a zero mean error.
Figure 9:
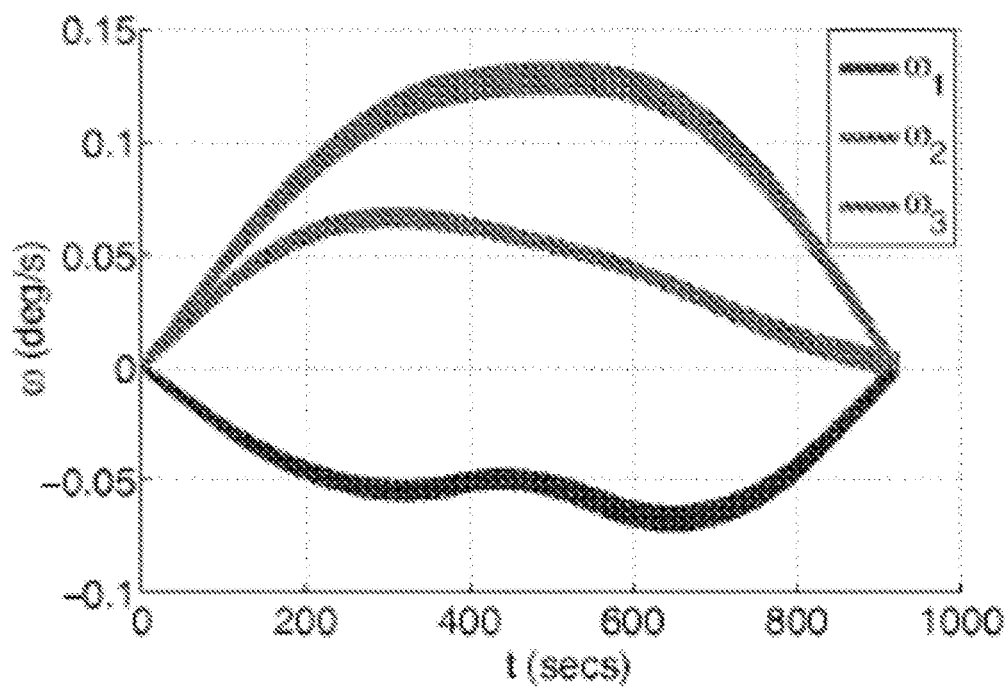
FIG. 9 shows a graph of the rotation rates corresponding to sigma point state trajectories for the Hubble Space Telescope that target a zero mean error.
Figure 10:
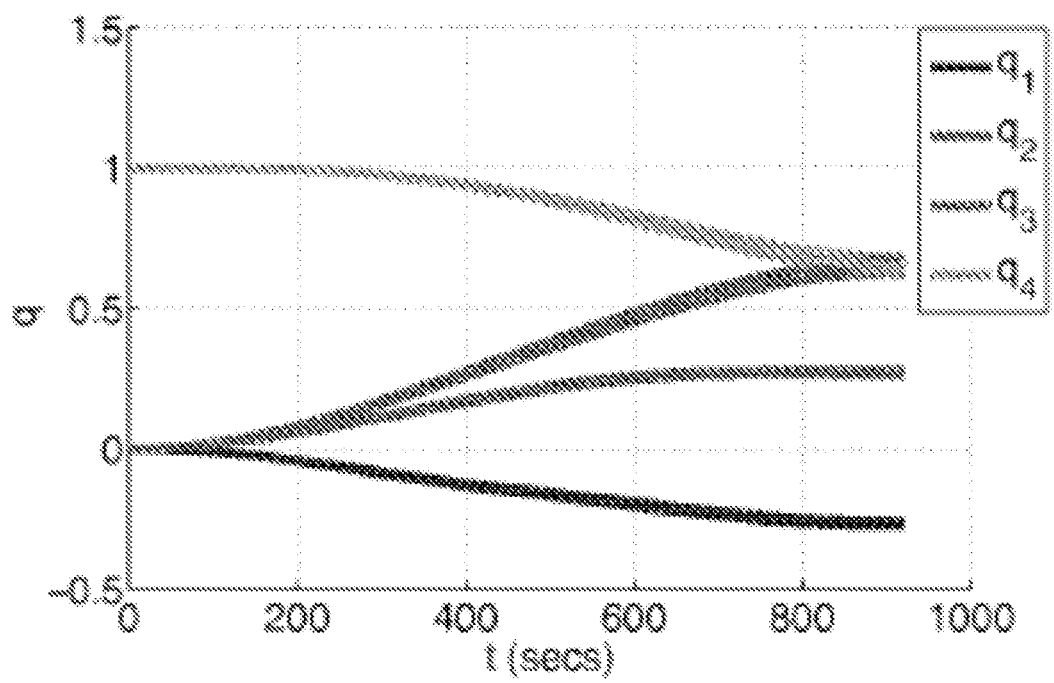
FIG. 10 shows graph of the quaternion states corresponding to sigma point state trajectories for the Hubble Space Telescope that targets a zero mean error.

In computing $\mu_x$, we note that it is important to satisfy the norm constraint $\|q\|_2 = 1$. A minimum time unscented optimal control problem can be posed as finding the open-loop control trajectory, $t \mapsto u$, that minimizes the endpoint cost function:

$$E(X(t_f), t_f) := t_f - t_0 \quad (32)$$

while satisfying all of the constraints including equation (29). This is now a high-dimensional optimal control problem that can be solved, for example, by using one of the largest PS methods implemented in DIDO™. The unscented optimal control generated by DIDO™ is shown in FIG. 8. The corresponding sigma point state trajectories are shown in FIGS. 9 and 10. It is apparent from these figures that the state-space constraints, taken from equations (22) and (23), are met by all of the sigma point trajectories. From the statistics of the endpoint values, provided in Table 3, it is clear that the mean is near zero, which is a significant improvement over the standard open-loop statistics of Table 2 above. The error mean in the target angles is only about 1 milli-arc seconds which demonstrates the feasibility of this method.

Figure 11:
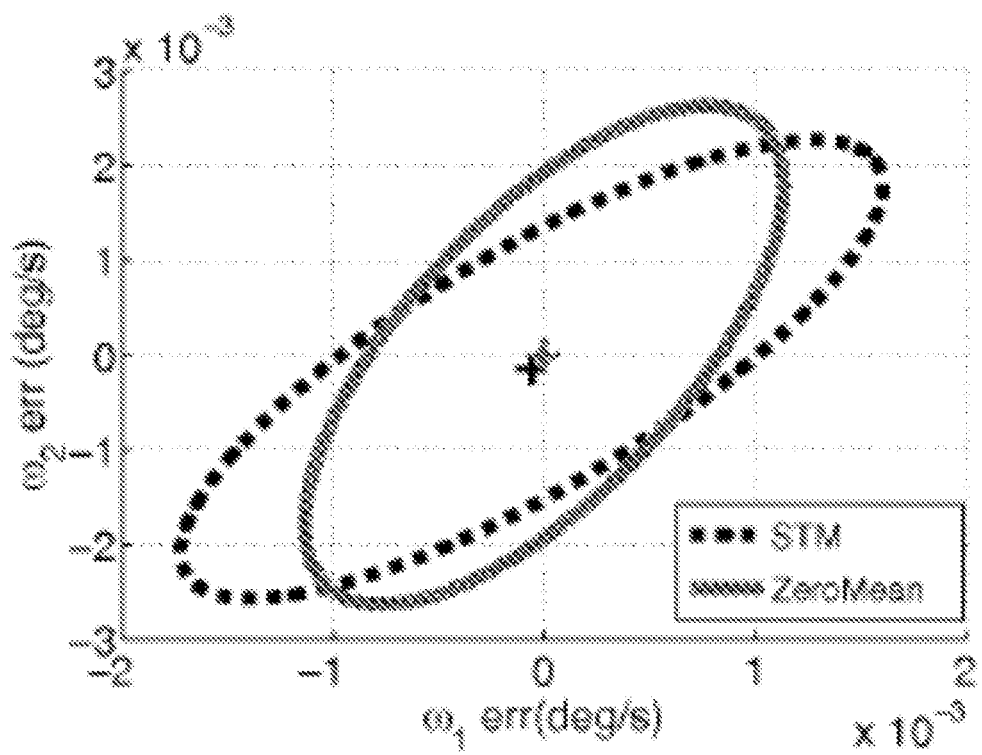
FIG. 11 shows a graph that compares the terminal covariance ellipse of a shortest time maneuver to the terminal ellipse of an unscented control that targets zero mean terminal error, comparing the first two rotation rates.
Figure 12:
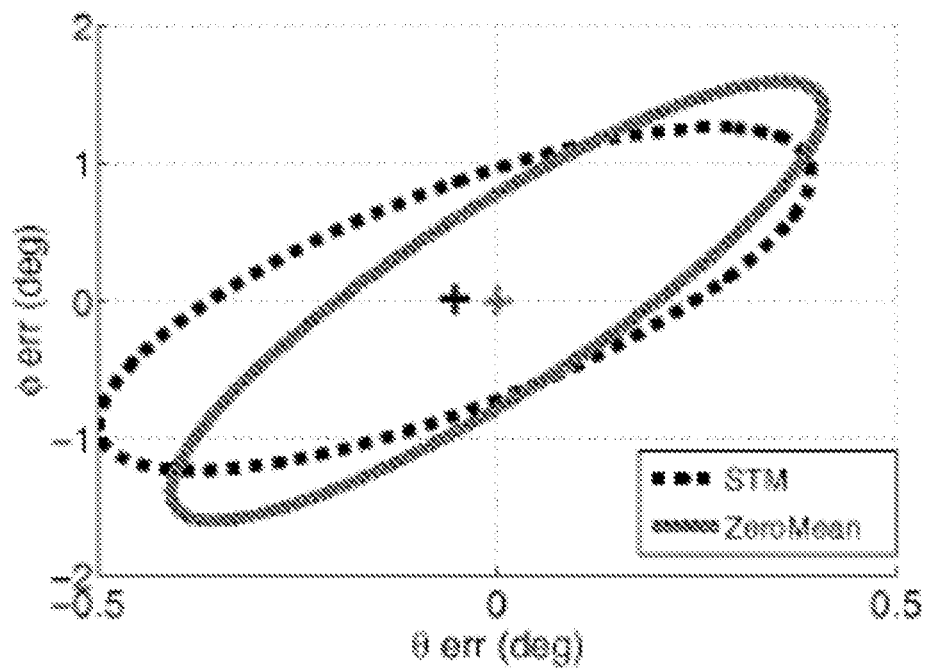
FIG. 12 shows a graph that compares the terminal covariance ellipse of a shortest time maneuver to the terminal ellipse of an unscented control that targets zero mean terminal error, comparing pitch θ, and roll, φ error.

As demonstrated above and in FIG. 8, the unscented control solution is implementable as a zero-gyro solution for the HST 10 since the mean error in the target angles is only about 1 milli-arc seconds which allows the HST's fine guidance sensor to acquire a science target. However, the approach may still be risky in practice because the covariances shown in Table 3 are about the same order of magnitude as those shown in Table 2 above. FIGS. 11 and 12 plot two illustrative covariance ellipses (STM) demonstrating that the means indicated by the + symbol in FIGS. 11 and 12 are within milli-arc seconds of the target but the spread shown by the covariance ellipses (STM) is about 1 degree which is a large enough error to have a significant adverse impact on the performance of HST 10. For example, the fine guidance sensor of the HST may not be able to lock onto the science target. Thus, it is necessary to determine a lower risk solution by controlling the variances at the target point in order to reduce the size of the terminal covariance ellipse.

TABLE 3

| Target Parameter | Error Mean | Standard Deviation |
|---|---|---|
| $\omega_1$ (arcsec/s) | −2.44E−15 | 4.10 |
| $\omega_2$ (arcsec/s) | 2.10E−14 | 9.47 |
| $\omega_3$ (arcsec/s) | −2.55E−15 | 1.26 |
| ψ (arcsec) | 1.20E−07 | 14,112 |
| θ (arcsec) | −2.72E−08 | 1476 |
| φ (arcsec) | 8.89E−08 | 5760 |

To reduce the error covariance of the exemplary unscented open-loop control described above, control over the spread of the final values of the sigma points is implemented. One measure of this spread is the variance; hence, an additional set of terminal conditions are proposed as given by, $$\text{diag}[\Sigma_{y(x)}(t_f)] \le [\sigma_\psi^2, \sigma_\theta^2, \phi_\phi^2, \sigma_{\omega 1}^2, \sigma_{\omega 2}^2, \sigma_{\omega 3}^2]^T \quad (33)$$

where $\sigma^2(.)$ are user-specified values of acceptable variances on the attitude angles given in terms of Euler angles and the angular rates and y represents the transformation from the quaternion space to the space of Euler angles for which the first three variances are defined. Thus, the new set of endpoint (terminal) conditions for this problem are given by, $$e_1(X(t_f)) := \mu_x(t_f) - x^f = 0 \quad (34)$$

$$e_2(X(t_f)) := \text{diag}[\Sigma_{y(x)}(t_f)] \le [\sigma_\psi^2, \sigma_\theta^2, \phi_\phi^2, \sigma_{\omega 1}^2, \sigma_{\omega 2}^2, \sigma_{\omega 3}^2]^T \quad (35)$$

The same process as before was followed to solve the new unscented control that additionally adheres to constraint (33). The statistics resulting from this solution are given in Table 4 below.

TABLE 4

| Target Parameter | Error Mean | Standard Deviation |
|---|---|---|
| $\omega_1$ (arcsec/s) | 3.60E−02 | 0.341 |
| $\omega_2$ (arcsec/s) | −6.77E−12 | .932 |
| $\omega_3$ (arcsec/s) | 6.77E−13 | .130 |
| ψ (arcsec) | 1.24E−06 | 1,436 |
| θ (arcsec) | −1.16E−06 | 153 |
| φ (arcsec) | 1.19E−06 | 619 |

Figure 13:
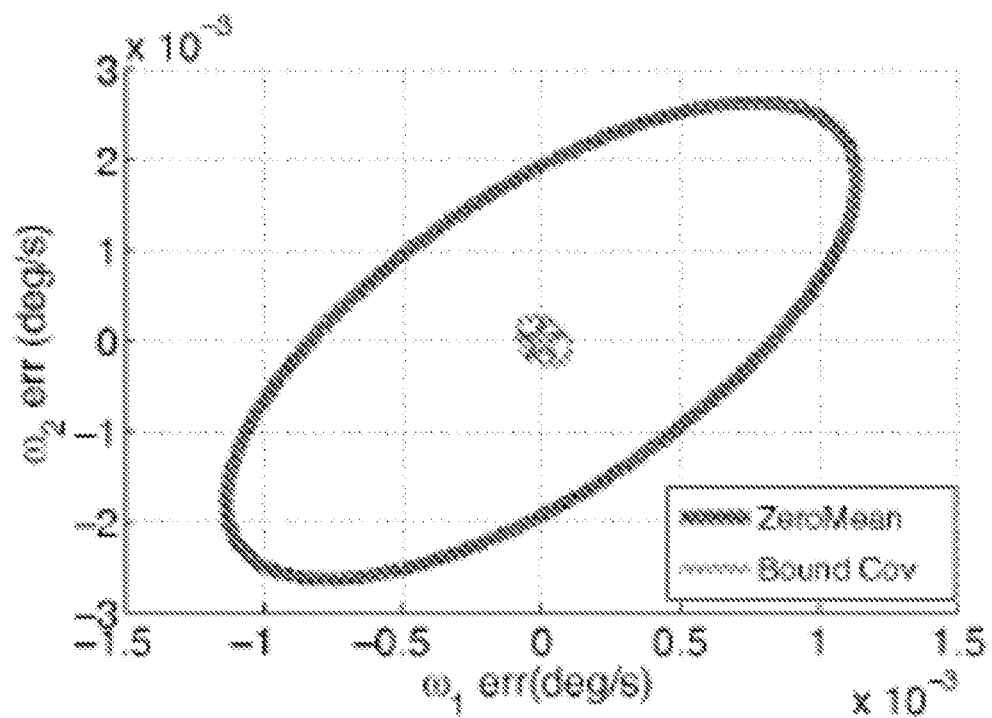
FIG. 13 is a graph showing a ten-fold reduction in the covariance of the target values of the sample state variables, employing an unscented control that bounds the terminal covariance while targeting the mean error.
Figure 14:
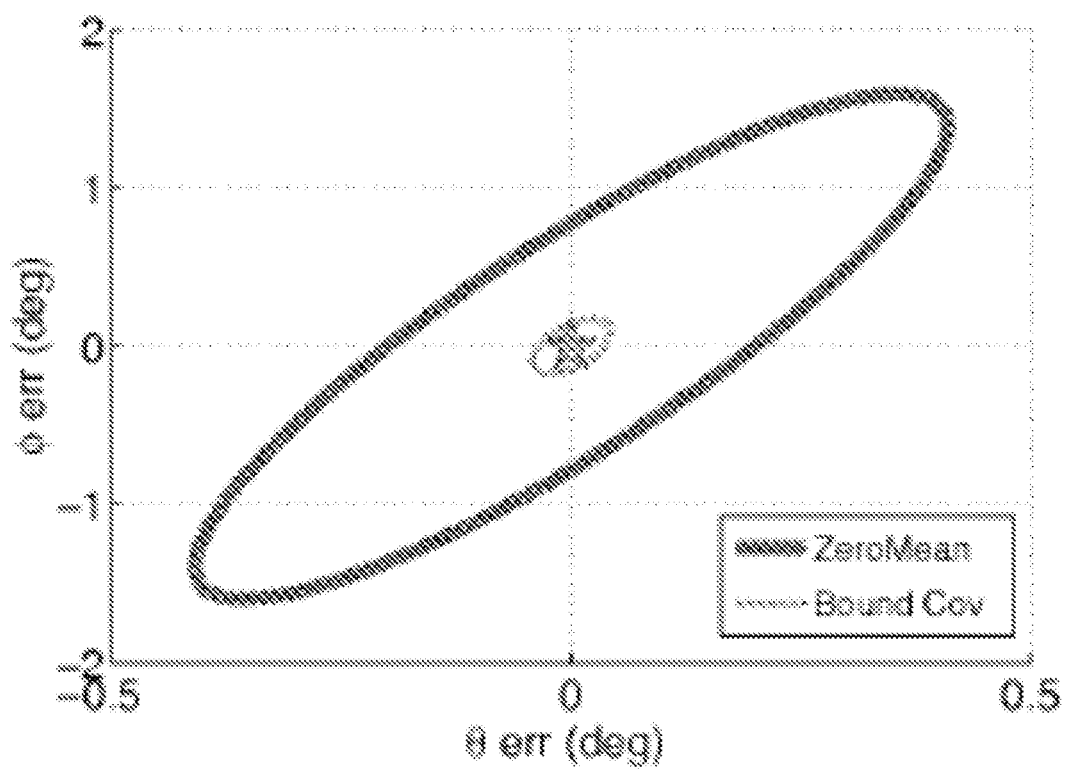
FIG. 14 is a second graph showing a ten-fold reduction in the covariance of the target values of the sample state variables, employing an unscented control that bounds the terminal covariance while targeting the mean error.

Comparing the last column of Table 4 with Table 3 above shows that this problem formulation achieved a ten-fold reduction in the standard deviations of the attitude angle and angular rate errors. This is further elaborated in FIGS. 13 and 14 where two illustrative covariance ellipses, denoted as Bound Cov, of both instances of unscented optimal control techniques are plotted showing that the spread shown by the covariance ellipses has been significantly reduced relative to the spread of FIGS. 11-12.

This example illustrates the viability of the present invention and process for an unscented control system as well as an actual real-life implementation of the unscented control system. The method described above can be used for controlling the HST 10. A skilled person in the art can also apply this same type of method for control of many other types of systems.

Example 2

The system and method may be employed to control a space mission. A typical space mission consists of several trajectory segments: from launch to orbit, to orbital transfers and possible reentry. The guidance and control problems for the end-to-end mission can be framed as a hybrid optimal control problem; i.e., a graph-theoretical optimal control problem that involves real and categorical (integer) variables. Even when the end-to-end problem is segmented into simpler phases as a means to manage the technical and operational complexity, each phase may still involve a multi-point optimal control problem. The sequence of the optimal control problems is dictated by mission requirements and many other practical constraints.

Optimal control techniques can be used to address challenges in guidance and control systems where the objectives are higher performance at reduced cost with demands for graceful degradation in the event of failures, unforeseen uncertainties and other unknowns. The traditional means to manage these uncertainties is feedback. However, in the absence of feedback or the absence of sufficient feedback for optimal control, there is no room for graceful degradation. Furthermore, management of uncertainties through the use of feedback principles alone is no longer the discriminating concept for inexpensive control systems. Unscented control offers an inexpensive and simple means to manage uncertainties in the absence of feedback. Furthermore, unscented optimal control offers an improved method for controlling other systems that have uncertain parameters.

It is to be understood, however, that even though numerous characteristics and advantages of the present invention have been set forth in the foregoing description, together with details of the method, composition and function of the invention, the disclosure is illustrative only, and changes may be made in detail, within the principles of the invention to the full extent indicated by the broad meaning of the terms in which the claims are expressed.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Other embodiments of the present disclosure will be apparent to those skilled in the art from consideration of the specification and practice of the embodiments disclosed herein. It is intended that the specification and examples be considered as exemplary only, with a true scope of the disclosure being indicated by the following claims.

All documents mentioned herein are hereby incorporated by reference in their entirety or alternatively to provide the disclosure for which they were s relied upon.

The applicant(s) do not intend to dedicate any disclosed embodiments to the public, and to the extent any disclosed modifications or alterations may not literally fall within the scope of the claims, they are considered to be part hereof under the doctrine of equivalents.

What is claimed is:

1. A method for providing or augmenting system control comprising:
   identifying a dynamical model of the system;
   determining a vector of one or more uncertain parameters and/or initial conditions of the system;
   computing sigma points and weights for each of the uncertain parameters and/or initial conditions;
   creating two or more copies of equations for dynamics of the system;
   establishing at least one outcome and/or at least one terminal constraint and/or at least one box bound and/or at least one path constraint for the system;
   providing a cost function for the system;
   performing unscented optimal control computations using said two or more copies of the equations for the dynamics of the system while minimizing the cost function and
   satisfying the at least one outcome and/or at least one terminal constraint and/or the at least one box bound and/or the at least one path constraint; and
   controlling the system based on results obtained from the unscented optimal control computation.

2. The method of claim 1, wherein pseudo-spectral optimal control theory is employed in the performing step.

3. The method of claim 1, wherein one or more of the at least one outcome and/or at least one terminal constraint and/or box bound and/or path constraint and/or cost function are weighted functions of the sigma points or their transformations according to the copies of the system dynamical model.

4. The method of claim 3, wherein one or more of the at least one terminal constraint and/or box bound and/or path constraint and/or cost function satisfy the weighted function:

$$g_L(X(t)) \leq \Sigma_{i=1}^{N\sigma} w_i X_i(t) \leq g^U(X(t))$$

representing mean values or combinations of mean values of the system states $X(t)$, wherein the bounds, gL and gU are each vectors whose individual entries may be functions of $X(t)$, or constants, or zero, w is a vector of weights associated with sigma points and $N\sigma$ is the number of sigma points.

5. The method of claim 4, wherein the terminal constraints, box bounds and path constraints satisfy the weighted function $g_L(X(t)) \leq \Sigma_{i=1}^{N\sigma} w_i X_i(t) \leq g^U(X(t))$.

6. The method of claim 3, wherein one or more of the at least one terminal constraint and/or box bound and/or path constraint and/or cost function satisfy the weighted function:

$$h_L(X(t)) \leq \Sigma_{i=1}^{N\sigma} w_i (X_i(t)-\mu_i)(X_i(t)-\mu_i)^T \leq h^U(X(t))$$

representing constraints on the covariance of the system states $X(t)$, or combinations thereof, bounds hL and hU are matrices whose individual entries may be functions of $X(t)$, or constants, or zero, w is a vector of weights associated with sigma points, $N\sigma$ is the number of sigma points, and $\mu_i$ is a mean sigma-point vector.

7. The method of claim 6, wherein the terminal constraint, box bounds and path constraints satisfy the weighted function $h_L(X(t)) \leq \Sigma_{i=1}^{No} w_i(X_i(t)-\mu_i)(X_i(t)-\mu_i)^T \leq h^U(X(t))$.

8. The method of claim 3, wherein the unscented optimal control computation minimizes the cost function $J=E(X(t_0, t_f)+\int_{t_o}^{t_f} F(X(t), u(t), t)dt$, wherein E is an endpoint cost function whose value depends on the values of state variables in vector X at an initial time $t_0$ and/or a final time $t_f$, F is a running cost functional where the value of the running cost at a final time $t_f$ depends on the integral of the function F from an initial time $t_o$ to a final time $t_f$, and the value of function F at a particular time depends on the values of the state variables in vector X and/or the values of the control variables in vector u and/or time t.

9. The method of claim 8, wherein the function $E=\Sigma_{i=1}^{No} w_i X_i(t_f)$.

10. The method of claim 8, wherein the function
$$E=\Sigma_{i=1}^{No} w_i (X_i(t_f)-\mu_i(t_f))(X_i(t_f)-\mu_i(t_f))^T$$
wherein $\mu i$ is a mean sigma-point vector.

11. The method of claim 8, wherein the function
$$F=\Sigma_{i=1}^{No} w_i (X_i(t_f)-\mu_i(t_f))(X_i(t_f)-\mu_i(t_f))^T$$
wherein $\mu i$ is a mean sigma-point vector.

12. The method of claim 8, wherein the uncertain parameters and/or initial states of the system have uniform probability distributions.

13. The method of claim 12, wherein a support ($I^d$) for the uniform probability distribution is represented by:

$$I^d = \overbrace{I \times I \times \ldots \times I}^{d-times}, \text{ where } I = [-1 \; 1]$$

wherein there are 2d order 3 sigma points, each order 3 sigma point has size $P_i=\sqrt{d/3}$ and associated weight $w_i=1/2d$ and the matrix Q is defined as:

$$Q = \begin{bmatrix} -\sqrt{d/3} & & & & \sqrt{d/3} & \\ & -\sqrt{d/3} & & & & \sqrt{d/3} \\ & & \ldots & & & \ldots \\ & & & -\sqrt{d/3} & \sqrt{d/3} & \end{bmatrix}.$$

14. The method of claim 13, wherein the order 3 sigma points for d>3 are within the support $I^d$.

15. The method of claim 14, wherein to insure that the support $I^d$ is satisfied, an orthogonal rotation matrix, M, with $M=[m_{ij}]$ and $$m_{ij} = \sqrt{\frac{2}{n+1}} \sin\left(\frac{\pi ij}{n+1}\right),$$

$1 \leq i, j \leq n$ so that $|m_{ij}| \leq \sqrt{3/d}$, is employed to provide the property that if $P=(p_{ij})=MQ$, then $|p_{ij}| \leq 1$ and P is a matrix wherein the 2d columns of P are the order 3 uniform probability distribution of sigma points that lie within the support $I^d$.

16. The method of claim 15, wherein for uniform probability distributions of dimensions (d) of 4 and 6, a Givens transformation is employed to compute the order 3 sigma points so that the sigma points that lie within the support $I^d$.

17. The method of claim 8, wherein the uncertain parameters and/or initial states of the system have Gaussian probability distributions.

18. The method of claim 17, wherein the sigma points are order 3 sigma points that match the first three moments of a Gaussian statistical distribution of an uncertain variable, and the sigma points are given as the columns of the matrix equation:

$$Q = \begin{bmatrix} -\sqrt{d} & & & & \sqrt{d} & \\ & -\sqrt{d} & & & & \sqrt{d} \\ & & \ldots & & & \ldots \\ & & & -\sqrt{d} & \sqrt{d} & \end{bmatrix}$$

presuming a zero mean and unity variance, wherein there are 2d order 3 sigma points, each sigma point has size given by $P_1=\sqrt{d}$ and the weight for each Sigma point is given by $w_i=1/(2d)$.

19. The method of claim 8, wherein the uncertain parameters and/or initial states of the system have mixed Gaussian and uniform probability distributions.

* * * * *